US011193305B2

(12) United States Patent
Helsley et al.

(10) Patent No.: US 11,193,305 B2
(45) Date of Patent: Dec. 7, 2021

(54) LOCK APPARATUS

(71) Applicant: HARTWELL CORPORATION, Placentia, CA (US)

(72) Inventors: Thomas J. Helsley, Placentia, CA (US); Lane Dennis Dalan, Hermosa Beach, CA (US)

(73) Assignee: Hartwell Corporation, Placentia, CA (US)

(*) Notice: Subject to any disclaimer, the term of this patent is extended or adjusted under 35 U.S.C. 154(b) by 420 days.

(21) Appl. No.: 16/393,646

(22) Filed: Apr. 24, 2019

(65) Prior Publication Data

US 2019/0249456 A1    Aug. 15, 2019

Related U.S. Application Data

(62) Division of application No. 15/510,139, filed as application No. PCT/US2015/049216 on Sep. 9, 2015, now Pat. No. 10,392,830.

(Continued)

(51) Int. Cl.
*E05B 27/00* (2006.01)
*E05B 27/08* (2006.01)
*E05B 13/10* (2006.01)
*E05B 63/12* (2006.01)
*E05B 15/02* (2006.01)
*E05B 41/00* (2006.01)

(Continued)

(52) U.S. Cl.
CPC ........ *E05B 27/0046* (2013.01); *E05B 13/002* (2013.01); *E05B 13/10* (2013.01); *E05B 15/0205* (2013.01); *E05B 27/0003* (2013.01); *E05B 27/0017* (2013.01); *E05B 27/0032* (2013.01); *E05B 27/083* (2013.01); *E05B 41/00* (2013.01); *E05B 63/12* (2013.01); *E05B 63/185* (2013.01); *E05C 19/14* (2013.01); *E05C 19/145* (2013.01); *B64D 29/08* (2013.01); *E05B 27/0053* (2013.01); *E05B 2015/023* (2013.01)

(58) Field of Classification Search
CPC .... E05B 13/002; E05B 13/10; E05B 15/0205; E05B 2015/023; E05B 27/0003; E05B 27/0017; E05B 27/0032; E05B 27/0046; E05B 27/083; E05B 41/00; E05B 63/12; E05B 63/185; E05C 19/14; E05C 19/145; B64D 29/08

See application file for complete search history.

(56) References Cited

U.S. PATENT DOCUMENTS 2,592,647 A    4/1952    Black
2,601,577 A    6/1952    Whitmore
(Continued)

FOREIGN PATENT DOCUMENTS

DE    102011000443    6/2012
WO    WO 2015/126950    8/2015

OTHER PUBLICATIONS

Safety First—The Airbus Safety Magazine, Issue 14 (Jul. 2012).
Extended Search Report issued in Appl. No. EP19177555.0 (dated Sep. 25, 2019).

*Primary Examiner* — Christopher J Boswell
(74) *Attorney, Agent, or Firm* — Barnes & Thornburg LLP

(57) ABSTRACT

A latch mechanism includes a hook-handle assembly coupled to a first panel and a clevis coupled to a second panel. The hook-handle assembly engages the clevis to secure the first panel relative to the second panel.

20 Claims, 14 Drawing Sheets

Related U.S. Application Data

(60) Provisional application No. 62/048,247, filed on Sep. 9, 2014.

(51) Int. Cl.
*E05C 19/14* (2006.01)
*E05B 13/00* (2006.01)
*E05B 63/18* (2006.01)
*B64D 29/08* (2006.01)

(56) References Cited

U.S. PATENT DOCUMENTS

| | | | |
|---|---|---|---|
| 2,677,261 A * | 5/1954 | Jacobi | E05B 13/002 70/14 |
| 2,710,214 A | 6/1955 | Summers | |
| 2,722,445 A | 11/1955 | Cudney | |
| 2,904,141 A | 9/1959 | Henrichs | |
| 3,070,395 A | 12/1962 | Morrison et al. | |
| 3,194,595 A | 7/1965 | Wheeler et al. | |
| 3,209,563 A | 10/1965 | Pelcin | |
| 3,279,836 A | 10/1966 | Swanson | |
| 3,420,077 A * | 1/1969 | Drazin | E05B 27/083 70/276 |
| 3,509,748 A * | 5/1970 | Trainor | E05B 27/083 70/491 |
| 3,958,821 A | 5/1976 | Scalera | |
| 3,961,507 A | 6/1976 | Falk | |
| 4,053,177 A | 10/1977 | Stammreich | |
| 4,069,696 A | 1/1978 | Steinbach | |
| 4,083,211 A * | 4/1978 | Scherbing | E05B 27/083 70/467 |
| 4,111,020 A | 9/1978 | Scherbing | |
| 4,116,479 A | 9/1978 | Poe | |
| 4,134,281 A | 1/1979 | Pelcin | |
| 4,191,036 A | 3/1980 | Steinbach | |
| 4,233,828 A * | 11/1980 | Dauenbaugh | E05B 27/083 70/383 |
| 4,268,077 A | 5/1981 | Bohleen et al. | |
| 4,307,905 A | 12/1981 | Poe et al. | |
| 4,413,849 A | 11/1983 | Davis et al. | |
| 4,446,709 A | 5/1984 | Steinbach | |
| 4,510,779 A | 4/1985 | Ahad | |
| 4,613,099 A | 9/1986 | Smith et al. | |
| 4,638,649 A | 1/1987 | Chao | |
| 4,704,884 A * | 11/1987 | Sugimoto | E05B 27/083 70/337 |
| 4,735,069 A | 4/1988 | Steinbach | |
| 4,736,174 A | 4/1988 | Castonguay et al. | |
| 4,743,052 A | 5/1988 | Stammreich et al. | |
| 4,899,565 A | 2/1990 | Steinbach | |
| 4,911,485 A | 3/1990 | Wasilewski | |
| 4,925,221 A | 5/1990 | Carmody et al. | |
| 4,934,164 A | 6/1990 | Shew | |
| 4,977,768 A | 12/1990 | Embry | |
| 5,018,376 A * | 5/1991 | Lee | E05B 27/083 70/419 |
| 5,024,072 A | 6/1991 | Lee | |
| 5,097,686 A | 3/1992 | Plumer | |
| 5,201,557 A | 4/1993 | Schlack | |
| 5,257,839 A | 11/1993 | Nielsen | |
| 5,267,762 A | 12/1993 | Gromotka | |
| 5,321,962 A | 6/1994 | Ferchau et al. | |
| 5,400,629 A * | 3/1995 | Myers | E05B 27/083 70/373 |
| 5,402,660 A | 4/1995 | Osada | |
| 5,454,239 A | 10/1995 | Esaki et al. | |
| 5,469,725 A | 11/1995 | Yamada | |
| 5,518,206 A | 5/1996 | Arnold et al. | |
| 5,620,212 A | 4/1997 | Bourne | |
| 5,638,709 A | 6/1997 | Clavin | |
| 5,664,813 A | 9/1997 | Gromotka | |
| 5,713,482 A | 2/1998 | Bordner | |
| 5,765,883 A | 6/1998 | Dessenberger et al. | |
| 5,819,563 A | 10/1998 | Bianco | |
| 5,984,382 A | 11/1999 | Bourne | |
| 6,174,007 B1 | 1/2001 | Schlack | |
| 6,279,971 B1 | 8/2001 | Dessenberger, Jr. | |
| 6,325,428 B1 | 12/2001 | Do | |
| 6,343,815 B1 | 2/2002 | Poe | |
| 6,513,841 B1 | 2/2003 | Jackson | |
| 6,644,078 B1 * | 11/2003 | Hung | E05B 9/086 70/351 |
| 7,017,955 B1 | 3/2006 | Chiang | |
| 7,150,168 B1 * | 12/2006 | Kuo | E05B 27/083 70/491 |
| 7,185,926 B2 | 3/2007 | Helsley et al. | |
| 7,454,934 B2 * | 11/2008 | Lin | E05B 27/005 70/351 |
| 7,461,871 B2 | 12/2008 | Vauchel | |
| 7,503,600 B2 | 3/2009 | Hautala et al. | |
| 8,113,551 B2 | 2/2012 | Baic et al. | |
| 8,186,728 B2 | 5/2012 | Kopylov | |
| 8,356,844 B2 | 1/2013 | Baic | |
| 8,419,088 B2 | 4/2013 | Baic et al. | |
| 8,544,900 B2 | 10/2013 | Elbrecht et al. | |
| 8,720,237 B2 | 5/2014 | Williams | |
| 8,764,072 B2 | 7/2014 | Gonidec | |
| 8,864,185 B2 | 10/2014 | Do | |
| 8,864,189 B2 | 10/2014 | Fournie | |
| 9,004,548 B2 | 4/2015 | Joret et al. | |
| 9,140,041 B2 | 9/2015 | Wollacott | |
| 9,169,678 B2 | 10/2015 | Rozema | |
| 9,353,559 B2 | 5/2016 | Fabre et al. | |
| 9,567,784 B2 | 2/2017 | Defrance | |
| 9,587,516 B2 | 3/2017 | Fabre et al. | |
| 9,650,807 B2 | 5/2017 | Helsley | |
| 10,119,299 B1 * | 11/2018 | Wu | E05B 27/0057 |
| 2002/0195827 A1 | 12/2002 | Jackson et al. | |
| 2003/0226385 A1 | 12/2003 | Chin-Shen | |
| 2004/0104583 A1 | 6/2004 | Porte | |
| 2004/0231379 A1 | 11/2004 | Yu | |
| 2006/0214431 A1 | 9/2006 | Helsley et al. | |
| 2007/0186601 A1 | 8/2007 | Lin | |
| 2008/0129056 A1 | 6/2008 | Hernandez et al. | |
| 2009/0134637 A1 | 5/2009 | Baic | |
| 2011/0101710 A1 | 5/2011 | Elbrecht et al. | |
| 2013/0238326 A1 | 12/2013 | DeFrance | |
| 2014/0030079 A1 | 1/2014 | Provost et al. | |
| 2014/0225380 A1 | 8/2014 | Gonidec | |
| 2015/0184543 A1 | 7/2015 | Fabre et al. | |
| 2015/0184544 A1 | 7/2015 | Fabre et al. | |

\* cited by examiner

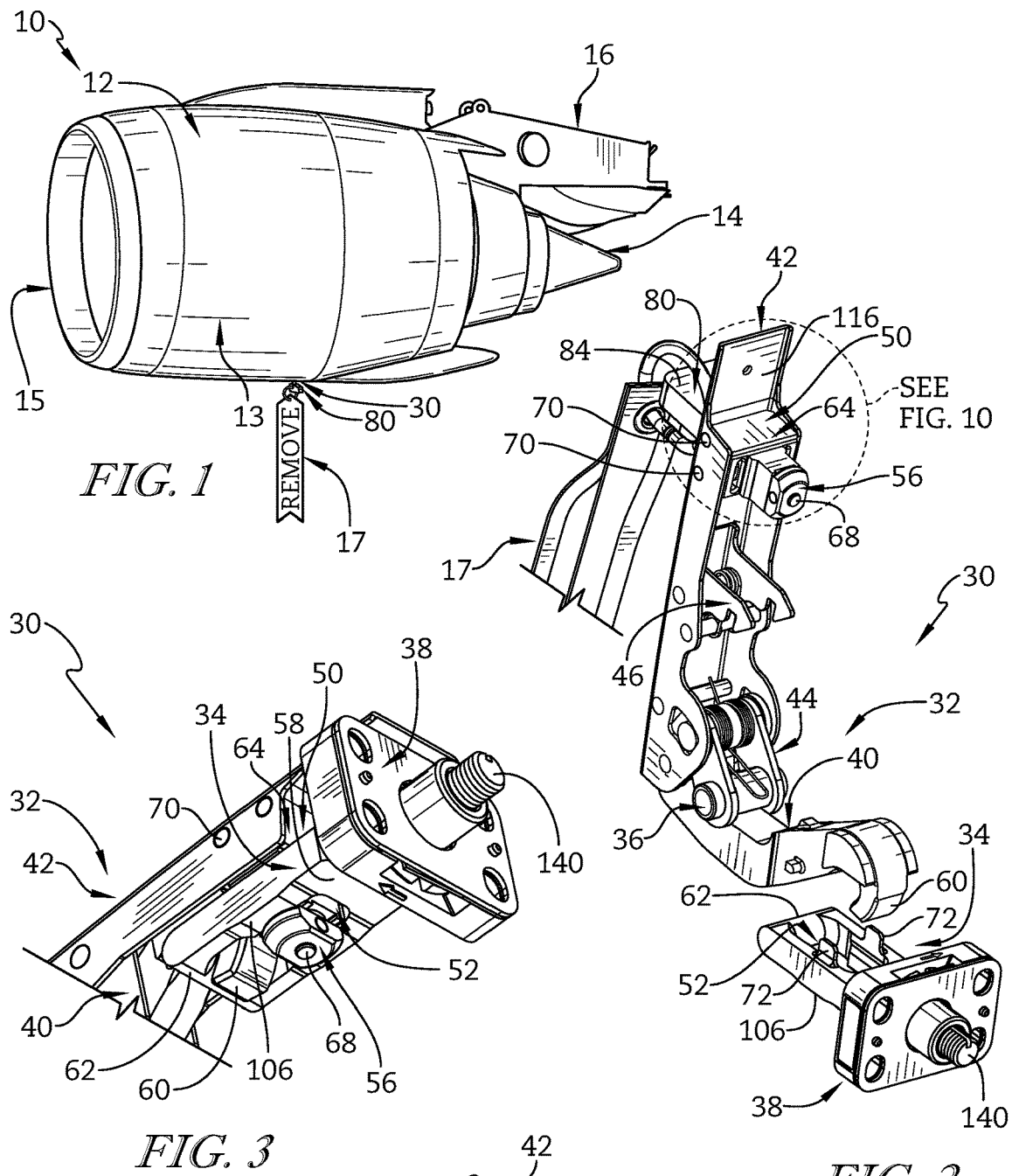

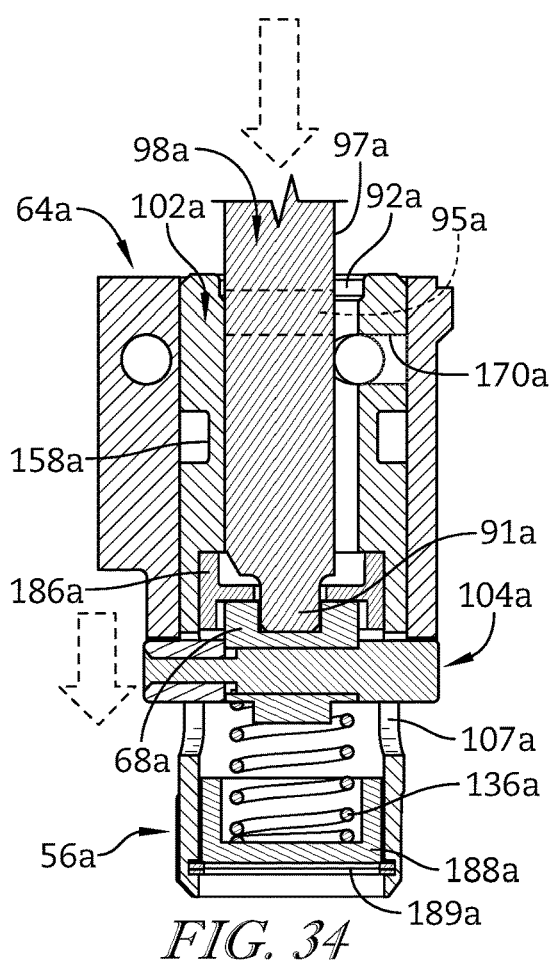
FIG. 34
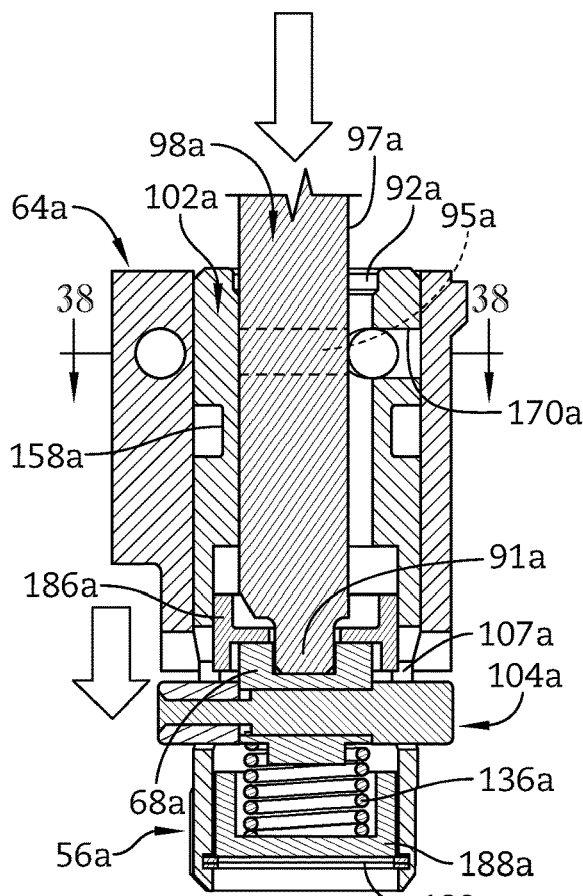
FIG. 35
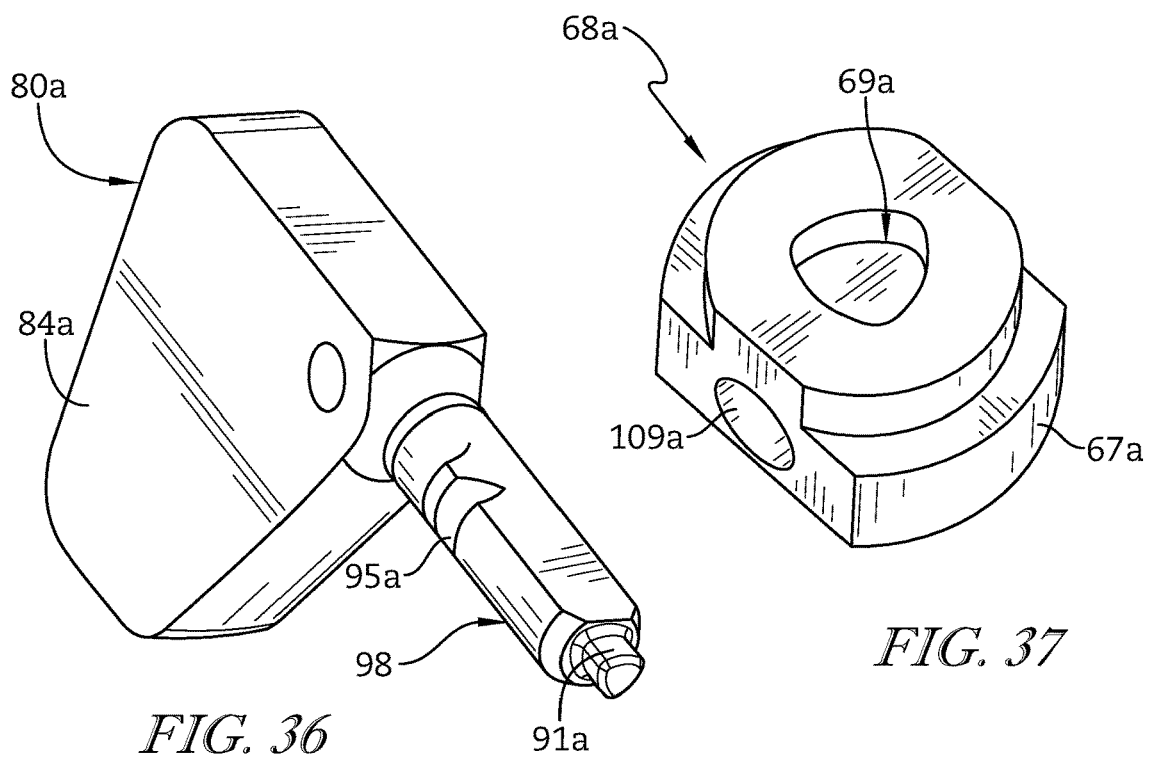
FIG. 36
FIG. 37

LOCK APPARATUS

CROSS REFERENCE TO RELATED APPLICATIONS

This application is a divisional of U.S. patent application Ser. No. 15/510,139, filed on Mar. 9, 2017, which is a U.S. nationalization under 35 U.S.C. § 371 of International Application No. PCT/US2015/049216, filed Sep. 9, 2015, which claims priority under 35 U.S.C. § 119(e) to U.S. Provisional Application Ser. No. 62/048,247, filed Sep. 9, 2014. The disclosures set forth in the referenced applications are incorporated herein by reference in their entireties.

FIELD OF THE DISCLOSURE

The present disclosure relates generally to a latch for an aircraft engine nacelle, and more specifically to a locking mechanism for such a latch.

BACKGROUND

A variety of latches are used on aircraft to retain various components of the aircraft in a locked condition under circumstances such as flight and storage of the aircraft. During maintenance or repair periods the latches must operate to unlock the corresponding panel, cowling or other device from the aircraft. For example, upon a cowling the latch is disengaged to allow the cowling to be operated away from the engine components which it houses. The cowling, once opened, allows the aircraft maintenance professional to access the engine components. At the end of the repair event the cowling is closed. The latch is used to lock the cowling in the closed condition to retain the engine components in the housed condition.

As an additional matter, the maintenance professional may use a device to "clip" the latches closed to keep them from projecting out from the aircraft body or housing. The latches are clipped in a closed or lower profile position to prevent the latches from becoming bumped or from bumping the maintenance professional. Clipping the latches does not necessarily close or lock the latch but allows the latch to be maintained in a much lower profile against the aircraft housing or body. Since the latches are in a lower profile configuration, they reduce the chance of the maintenance professional bumping into them either with his body or with a piece of equipment. This can be useful to protect the latches as well as the maintenance professional. However, clipped latches can inadvertently appear to be locked and as such may fail to be locked. Additionally, even if the latches are operated to attempt to lock them a potential issue with the latch mechanism might interfere with complete locking and as such could inadvertently unlatch during operation. It would be desirable to develop a system and assembly to be used with a latch to help provide assurances that the latch will, in fact, be closed and locked in the proper position.

This background information is provided to provide some information believed by the applicant to be of possible relevance to the present disclosure. No admission is intended, nor is such an admission to be inferred or construed, that any of the preceding information constitutes prior art against the present disclosure. Other aims, objects, advantages and features of the disclosure will become more apparent upon reading of the following non-restrictive description of specific embodiments thereof, given by way of example only with reference to the accompanying drawings.

SUMMARY

The present disclosure includes a clevis-sensing lock assembly for use with a latching system. The clevis-sensing lock can be installed into the latching system and provides structures which function to prevent operation of the clevis in the unlocked position. A device such as a key or tool is used to unlock the latch and allow it to open. The structure and function of the clevis-sensing lock retains this device in the lock to prevent its removal unless the latch is in the fully closed position. Once in the fully closed position the lock can be closed and the device removed. Additionally, an indicator or flag can be added to the device to further enhance the visibility of the locked or unlocked condition of the latch. The lock provides structures which function to interfere with the operation of the clevis until the latch is in the desired closed and confirmed locked position. The clevis-sensing lock can be used with a specially designed latch or retrofitted to be used with a variety of latches. The variety of latches can be remanufactured to provide the same or substantially the same envelope of operation using virtually the same components but replacing portions of the trigger assembly with the lock assembly.

According to the present disclosure, a latch mechanism includes a hook-handle assembly, a clevis, and a clevis-sensing lock. The hook-handle assembly may include a hook member, a handle, and a linkage arrangement coupled between the hook member and handle. The clevis may include a hook-end receiver and a coupler portion spaced apart from the hook-end receiver to at least partially define an opening therebetween.

In illustrative embodiments, the hook-end receiver may be configured to engage with a hook end of the hook member as the handle moves from an open position extending away from the clevis toward a closed position extending toward the clevis.

In illustrative embodiments, the clevis-sensing lock may be coupled to the handle to move with the handle. The clevis-sensing lock may include a block, a lock cylinder received in the block and configured to rotate relative to the block, and an interference member coupled to the lock cylinder to rotate with the lock cylinder relative to the block.

In illustrative embodiments, the interference member may be configured to pass through the opening of the clevis and rotate relative to the block to engage an underside of the clevis and the lock cylinder may be configured to control rotation of the interference member.

In illustrative embodiments, the latch mechanism may further include a tumbler arrangement coupled between the lock cylinder and the block and configured to control rotation of the lock cylinder relative to the block.

In illustrative embodiments, the tumbler arrangement may include a detent spring, a detent pin positioned between the lock cylinder and the detent spring, and a tumbler pin positioned between the detent pin and the lock cylinder. The detent spring may be configured to bias the detent pin toward the tumbler pin. The detent pin may be configured to engage with the block and the lock cylinder to restrict rotation of the lock cylinder when an interface between the detent pin and the tumbler pin is misaligned from a lower surface of the lock cylinder.

In illustrative embodiments, the latch mechanism may further include a key configured to be received in the lock cylinder to engage with the tumbler pin and to align the interface between the detent pin and the tumbler pin with the lower surface of the lock cylinder.

In illustrative embodiments, the latch mechanism may further include a key having a head and a shaft coupled to the head. The shaft may be configured to be received in the lock cylinder to engage with the tumbler arrangement to allow rotation of the lock cylinder and the head may be configured to extend away from the handle to provide an indication of an unlocked state of the clevis-sensing lock.

In illustrative embodiments, the key may further include a protrusion extending outward from the shaft and configured to engage with the handle to trap the shaft within the lock cylinder when the lock cylinder is rotated relative to the block.

In illustrative embodiments, the lock cylinder may be formed to include an annular groove and an axial slot extending toward the interference member from the annular groove.

In illustrative embodiments, the latch mechanism may further include a cross-pin configured to slide in the annular groove and axial slot of the lock cylinder to control rotation of the lock cylinder.

In illustrative embodiments, the latch mechanism may further include the clevis may further include a fin extending from an upper surface clevis opposite the underside. The fin may be configured to move the cross-pin out of the axial slot and into the annular groove to allow rotation of the lock cylinder as the handle moves toward the closed position.

In illustrative embodiments, the lock cylinder may be formed to include a groove extending at least partially around a circumference of the lock cylinder. A fastener may extend through the handle and the block to couple the clevis-sensing lock to the handle and may be received in the groove of the lock cylinder.

In illustrative embodiments, the groove of the lock cylinder may be configured to limit rotation of the lock cylinder relative to the block.

According to the present disclosure, a method of operating a latch mechanism may include inserting a key into a clevis-sensing lock through an aperture formed in a handle of a hook-handle assembly, rotating the key to disengage an interference member of the clevis-sensing lock from a clevis, moving the handle relative to the clevis to disengage a fin of the clevis from the clevis-sensing lock to engage a cross-pin of the clevis-sensing lock with a lock cylinder of the clevis-sensing lock to block rotation of the key such that the key is trapped in the clevis-sensing lock, and moving the handle to disengage a hook member of the hook-handle assembly from the clevis.

In illustrative embodiments, the method may further include moving the handle toward the clevis to engage the hook member with the clevis, moving the handle toward the clevis to engage the fin with the clevis-sensing lock to disengage the cross-pin from the lock cylinder to allow rotation of the key, rotating the key such that the interference member is engaged with an underside of the clevis, and removing the key from the clevis sensing lock.

In illustrative embodiments, inserting the key may include extending a shaft of the key into the lock cylinder and engaging a tumbler arrangement to allow rotation of the interference member.

In illustrative embodiments, removing the key may include removing the shaft from the lock cylinder and disengaging the tumbler arrangement to block rotation of the interference member.

According to the present disclosure, a clevis-sensing lock may include a block, a lock cylinder, a cross-pin, a tumbler arrangement, a coupler shaft, and an interference member. The block may be formed to include a cylinder-receiving bore extending into the block and a pin-receiving slot extending into the block to intersect with the cylinder-receiving bore. The lock cylinder may be configured to be received in the cylinder-receiving bore of the block and rotate relative to the block. The lock cylinder may include a first end and a second end spaced apart from the first end. The lock cylinder may be formed to include an annular groove, an axial slot extending toward the first end of the lock cylinder from the annular groove, and a key-receiving bore extending from the second end toward the first end.

In illustrative embodiments, the cross-pin may be positioned within the pin-receiving slot of the block and configured to slide in the annular groove and axial slot of the lock cylinder to control rotation of the lock cylinder.

In illustrative embodiments, the tumbler arrangement may be coupled between the lock cylinder and the block and configured to control rotation of the lock cylinder.

In illustrative embodiments, the coupler shaft may be positioned within the key-receiving bore and coupled with the lock cylinder to rotate therewith.

In illustrative embodiments, the interference member may be coupled to the coupler shaft at the first end of the lock cylinder to rotate with the lock cylinder.

In illustrative embodiments, the clevis-sensing lock may further include a guide pin having a head and a hole extending through the head. The block may be formed to include a cavity configured to receive the guide pin. The cross-pin may extend through the hole of the guide pin.

In illustrative embodiments, the tumbler arrangement may include a detent spring, a detent pin positioned between the lock cylinder and the detent spring, and a tumbler pin positioned between the detent pin and the lock cylinder. The detent spring may be configured to bias the detent pin toward the tumbler pin. The detent pin may be configured to engage with the block and the lock cylinder to restrict rotation of the lock cylinder when an interface between the detent pin and the tumbler pin is misaligned from a lower surface of the lock cylinder.

In illustrative embodiments, the clevis-sensing lock may further include a fastener extending through the block. The lock cylinder may be formed to include a groove extending at least partially around a circumference of the lock cylinder. The fastener may be received in the groove of the lock cylinder. The groove of the lock cylinder may be configured to limit rotation of the lock cylinder relative to the block.

Other aims, objects, advantages and features of the disclosure will become more apparent upon reading of the following non-restrictive description of specific embodiments thereof, given by way of example only with reference to the accompanying drawings.

BRIEF DESCRIPTION OF THE DRAWINGS

The present disclosure will be described hereafter with reference to the attached drawings which are given as a non-limiting example only, in which:

FIG. 1 is a perspective view of an aircraft engine assembly showing that the engine assembly includes a nacelle or fan cowl surrounding a gas turbine engine supported on an aircraft by an engine-mounting bracket and suggesting that the fan cowl incorporates a latch mechanism in accordance with the present disclosure having a flag to indicate to an operator when the latch mechanism is in an unlocked state;

FIG. 2 is a perspective view of the latch mechanism of FIG. 1 showing the latch mechanism in an unlocked and open state and suggesting that a hook member is spaced apart from a clevis to allow panels of the fan cowl to be moved from a closed position to an open position;

FIG. 3 is a lower perspective view of the latch mechanism of FIG. 2 showing the latch mechanism in a locked and closed state and suggesting that a clevis-sensing lock extends through the clevis and engages with flats on an underside of the clevis;

FIG. 4 is an upper perspective view of the latch mechanism of FIG. 3 showing the latch mechanism in the locked and closed state and suggesting that the clevis-sensing lock retains the latch mechanism in the locked and closed state to prevent inadvertent opening of the latch mechanism;

FIG. 34 is a sectional view taken along line 34-34 in FIG. 32;

FIG. 35 is a view similar to FIG. 34;

FIG. 36 is a perspective view of a key used with the alternative clevis-sensing lock of FIG. 31;

FIG. 37 is a perspective view of a key interface of the alternative clevis-sensing lock of FIG. 31;

Figure 5:
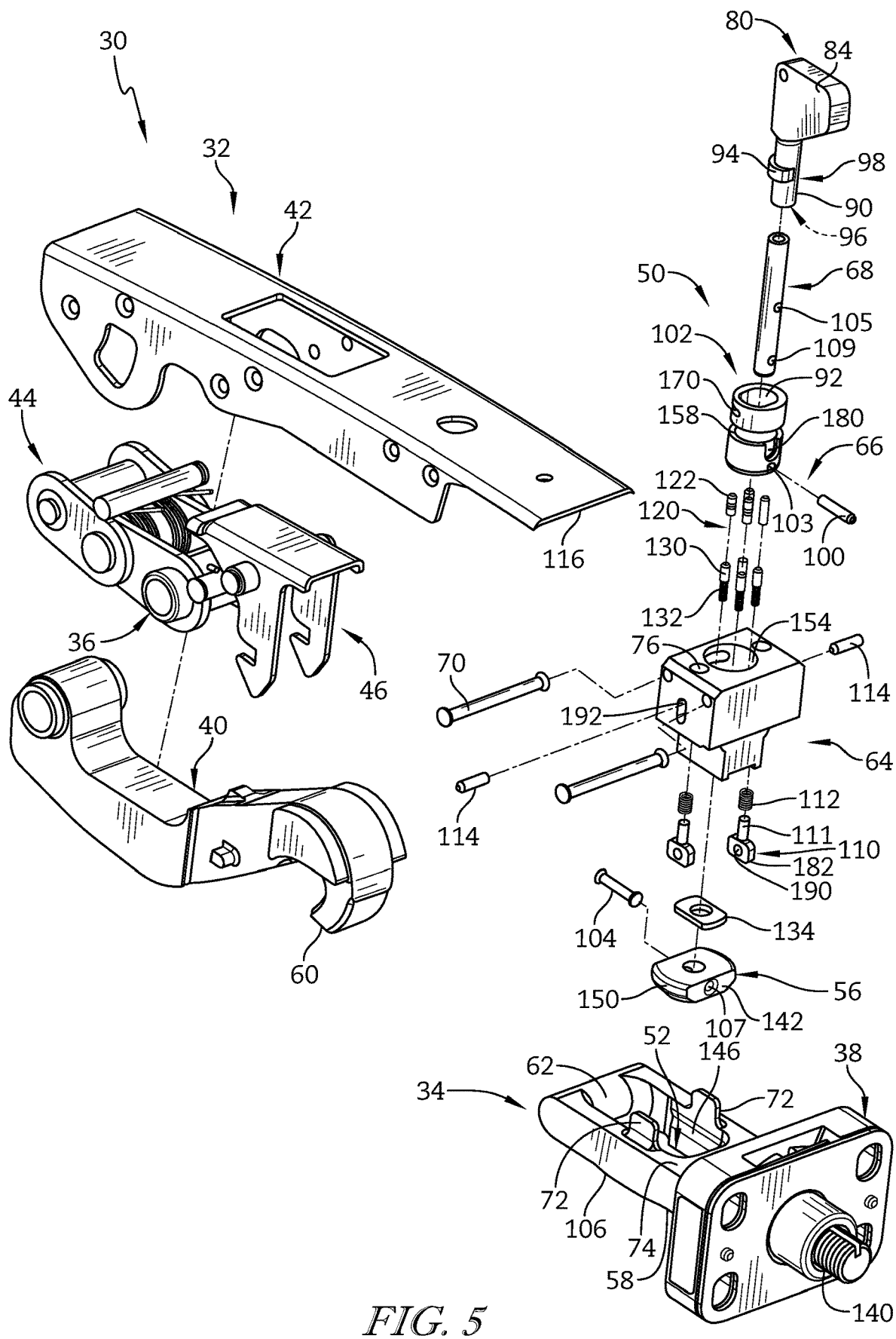
FIG. 5 is an exploded perspective view of the latch mechanism of FIG. 2 showing that the clevis-sensing lock includes a block, a lock cylinder, and an interference member coupled to the lock cylinder and suggesting that a tumbler pin arrangement regulates movement of the lock cylinder.
Figure 6:
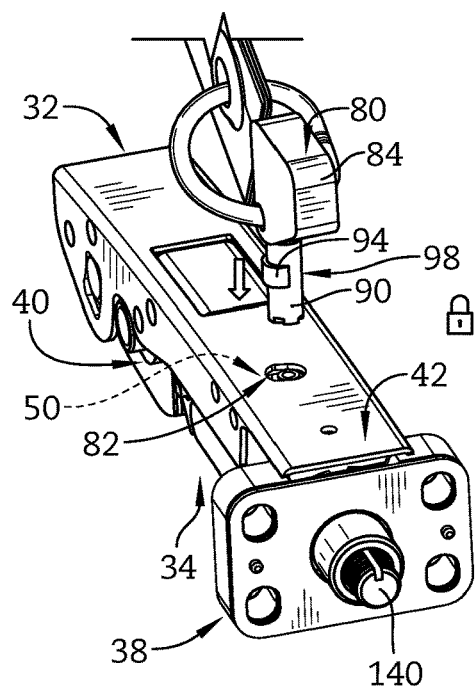
FIG. 6 is a perspective view of the latch mechanism of FIG. 4 showing a key having the flag attached thereto positioned for insertion into the latch mechanism to engage with the clevis-sensing lock.
Figure 7:
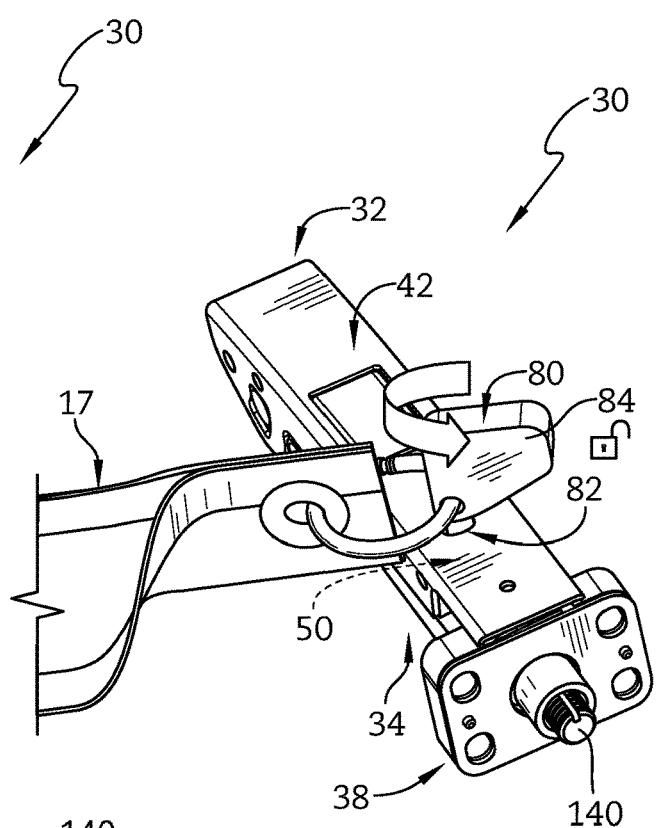
FIG. 7 is a view similar to FIG. 6 showing the key inserted into to the clevis-sensing lock and suggesting that the keys is rotated to place the latch mechanism into an unlocked and closed position to allow a user to open the latch mechanism.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

The foregoing terms as well as other terms should be broadly interpreted throughout this application to include all known as well as all hereafter discovered versions, equivalents, variations and other forms of the abovementioned terms as well as other terms. The present disclosure is intended to be broadly interpreted and not limited.

An engine assembly 10 for attachment with an aircraft is shown in FIG. 1. Engine assembly 10 includes a nacelle or fan cowl 12 positioned to surround a gas turbine engine 14 supported by an engine-mounting bracket 16 for securing engine assembly 10 to the aircraft. Nacelle 12 includes a right-side panel 13 and a left-side panel 15 which are movable relative to engine 14 between a closed position, shown in FIG. 1, and an open position extending away from engine 14.

A latch mechanism 30 is coupled between panels 13, 15 to secure panels 13, 15 in the closed position at the selection of a user as suggested in FIG. 1. One of the problems that can occur with such a latch mechanism is that the latch mechanism can be mislocked. In this regard, the latch mechanism can be closed under some circumstances and appear to be locked to the maintenance professional, when, in fact, it may not be fully engaged or fully locked. It is important to return the aircraft components, such as panels, doors, and cowlings, to the appropriate in-flight condition to seal and house the portions of the aircraft. It is also important to maintain the latch mechanism to retain these components in the closed locked condition. As such, it is important to provide a system to assure that the latch mechanism is, in fact, in the appropriate condition when locked.

As such, latch mechanism 30 includes a hook-handle assembly 32 coupled to one of panels 13, 15 and a clevis 34 coupled to the other of panels 13, 15 as suggested in FIG. 2. A clevis-sensing lock 50 in accordance with the present disclosure is coupled to hook-handle assembly 32 and is configured to pass through and engage with clevis 34 to maintain latch mechanism 30 in a locked and closed position as suggested in FIGS. 3 and 4. It should be noted, that clevis-sensing lock 50 can be configured for use with a variety of latch mechanisms.

A key 80 is inserted into clevis-sensing lock 50 to unlock latch mechanism 30 as suggested in FIGS. 2 and 6-9. In the illustrative embodiment, a signal flag 17 is coupled to key 80 to indicate to an operator or user that latch mechanism 30 is unlocked as suggested in FIGS. 1 and 2. An enlarged head 84 of key 80 also provides such an indication if signal flag 17 is lost or removed inadvertently. Signal flag 17 and key 80 allow a user to inspect engine assembly 10 to ensure that latch mechanisms 30 are locked and closed to secure panels 13, 15 in the closed position. For example, if no signal flag 17 or key 80 are visible, then there is an indication that latch mechanisms 30 are in the locked and closed position as suggested in FIG. 4.

Hook-handle assembly 32 includes a handle 42 used to operate latch mechanism 30, a hook member 40, and a linkage arrangement 44 coupled between handle 42 and hook member 40 as suggested in FIGS. 2 and 5. Latch mechanism 30 is coupled to one of panels 13, 15 by inserting a pin through a sleeve 36 of linkage arrangement 44. Hook-handle assembly 32 moves relative to the pin inserted through sleeve 36 between the unlocked and open position, shown in FIG. 2, and the locked and closed position, shown in FIG. 4, and as suggested in FIGS. 22-24.

Clevis 34 includes a hook-end receiver 62 for engaging with a hook end 60 of hook member 40 and a coupler portion 140 coupled to a clevis retainer 38 as suggested in FIG. 2. In the illustrative embodiment, coupler portion 140 is threaded. Clevis retainer 38 couples with the other of panels 13, 15 opposite hook-handle assembly 32 and is configured to allow axial adjustment of clevis 34 by engaging with coupler portion 140. Handle 42 is rotated toward clevis 34 to engage hook end 60 with hook-end receiver 62 and pass an interference member 56 of clevis-sensing lock 50 through an opening 52 of clevis 34, and interference member 56 is rotated by key 80 to engage with flats 106 on an underside 58 of clevis 34 to secure panels 13, 15 in the closed positon so that key 80 can be removed as suggested in FIGS. 2-4. Clevis 34 also includes fins 72 positioned on an upper surface 74 to engage with clevis-sensing lock 50 to allow rotation and removal of key 80 as suggested in FIGS. 25-27.

Figures 10, 11:
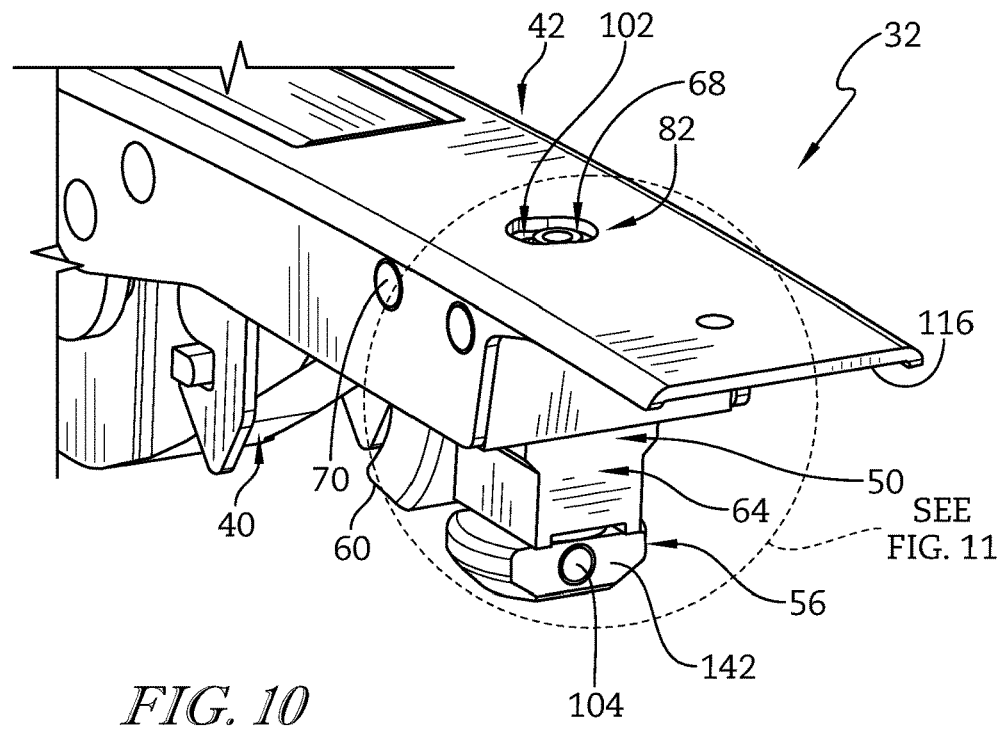
FIG. 10 is an enlarged perspective view of a hook latch assembly of the latch mechanism of FIG. 2 and showing that the clevis-sensing lock is coupled to an underside surface of a handle of the hook latch assembly.
FIG. 11 is an enlarged view of the clevis-sensing lock of FIG. 10 showing that the lock cylinder extends into the block and a coupler shaft extends through the lock cylinder and interference member to couple the interference member with the lock cylinder to rotate therewith.
Figure 12:
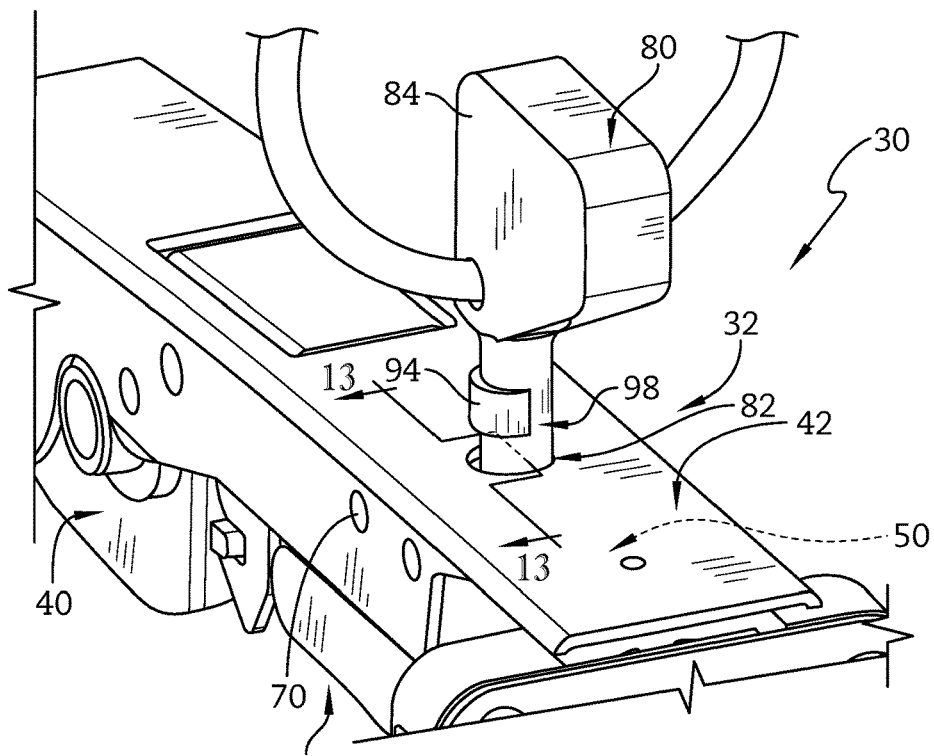
FIG. 12 is a perspective view of the latch mechanism of FIG. 6 showing the key partially inserted into the clevis-sensing lock.

Clevis-sensing lock 50 includes a block 64 coupled to an underside surface 116 of handle 42 and a coupler shaft 68 configured to couple interference member 56 with block 64 as suggested in FIGS. 2 and 10-11. Block 64 is coupled to handle 42 by pins 70 and is configured to receive a tumbler assembly 66 to control rotation of interference member 56 as suggested in FIG. 5. In some embodiments, pins 70 are in the form of a removable fastener or in the form of a rivet-type fastener. A lock cylinder 102 of tumbler assembly 66 is received in a bore 154 of block 64 and coupled to coupler shaft 68 to rotate with interference member 56 as suggested in FIG. 5. A tumbler pin arrangement 120 of tumbler assembly 66 is positioned between lock cylinder 102 and block 64 to control movement of lock cylinder 102 as suggested in FIGS. 5 and 12-14. Lock cylinder 102 is formed to include a bore 92 configured to receive a shaft 98 of key 80 for rotation of lock cylinder 102 and interference member 56 as suggested in FIGS. 5 and 15-18.

To assemble clevis-sensing lock 50, coupler shaft 68 is positioned within bore 92 of lock cylinder 102, and a pin 100 is engaged with holes 103, 105 of coupler lock cylinder 102 and coupler shaft 68, respectively, as suggested in FIG. 5. Tumbler pin arrangement 120 includes detent pins 130, detent springs 132, and discrete length tumbler pins 122. In the illustrative embodiment, four of each of detent springs 132, detent pins 130, and tumbler pins 122 are shown. In some embodiments, more or less of each of detent springs 132, detent pins 130, and tumbler pins 122 are used. The unique arrangement of tumbler pins 122 between various latch mechanisms 30 provides a degree of selectivity to allow only certain keys 80 to work with each clevis-sensing lock 50, thus providing a general security keying feature. While a uniform key could be used across all latching platforms, the additional security may enhance the use of the clevis-sensing lock 50 to provide security features as well as the above described and herein described benefits.

Tumbler pins 122 are inserted into corresponding bores within lock cylinder 102 and lock cylinder 102 is inserted into bore 154 of block 64 as suggested in FIG. 5. Detent pins 130 are inserted into block 64 to engage with tumbler pins 122 and detent springs 132 are inserted into block 64 to engage with detent pins 130. A retainer plate 134 is engaged with an underside of block 64 to retain tumbler pin arrangement 120 within block 64. Coupler shaft 68 is inserted though interference member 56 and is coupled to coupler shaft 68 by a pin 104 extending through holes 107, 109 of interference member 56 and coupler shaft 68, respectively.

Guide pins 110 are received in cavities 76 of block 64 as suggested in FIG. 5. Guide pins 110 include a head 182 and shaft 111 coupled to head 182. A spring 112 is positioned to surround shaft 111. Head 182 is formed to include a hole 190 for receiving a cross-pin 114. Guide pins 110 and springs 112 are inserted into cavities 76 and cross-pins 114 are inserted through slots 192 formed in block 64 and holes 190 of heads 182 to retain guide pins 110 within cavities 76. Block 64 is coupled to handle 42 by pins 70 such that an upper portion of cavities 76 and side portions of slots 192 are covered. As such, handle 42 retains springs 112 within cavities 76 and cross-pins 114 within slots 192.

Figure 8:
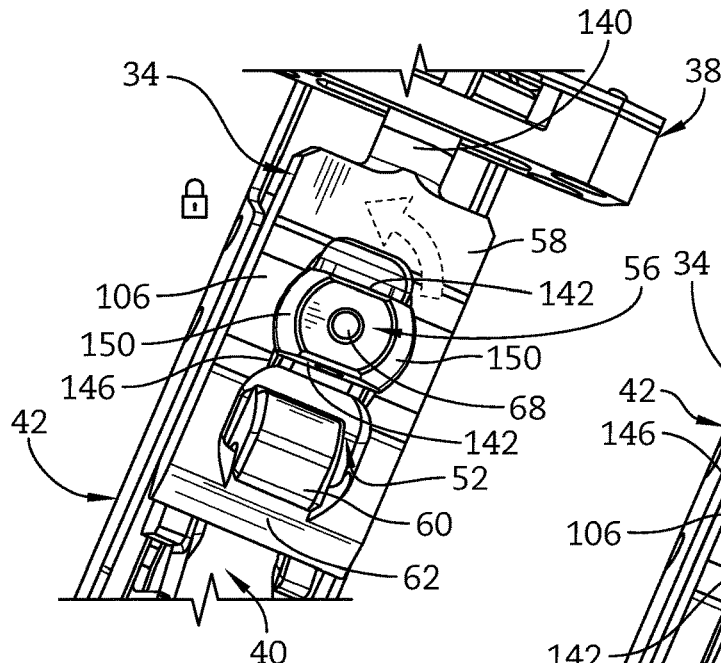
FIG. 8 is a lower perspective view of the latch mechanism of FIG. 7 showing that protruding ends of the interference member engages with the flats on a narrowed portion of the clevis prior to rotation of the key.
Figure 9:
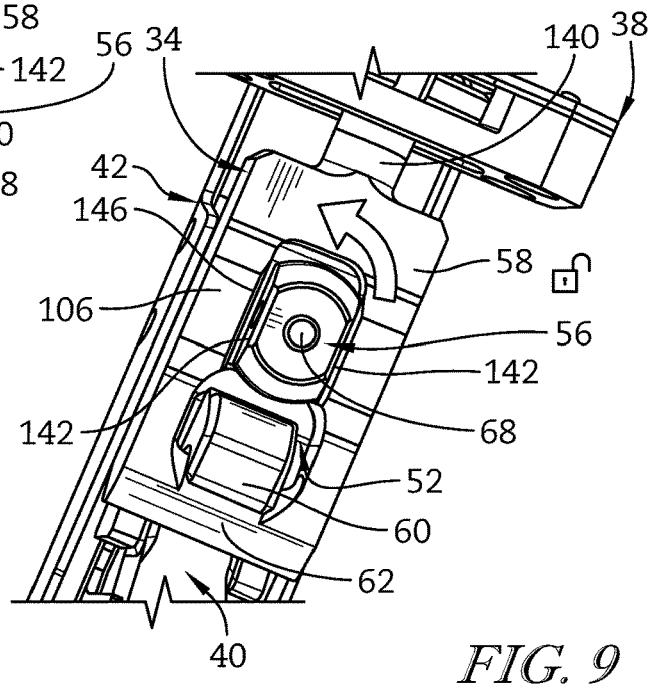
FIG. 9 is a view similar to FIG. 8 showing the interference member rotated with the key such that flats of the interference member is aligned with the narrowed portion to allow the interference member to pass out through an opening of the clevis.

Interference member 56 includes protruding portions 150 and flats 142 extending between protruding portions 150 as shown in FIG. 8. Protruding portions 150 are configured to engage with flats 106 of a narrowed portion 146 of clevis 34 to lock latch mechanism 30. Key 80 is inserted through an aperture 82 in handle 42 to engage with clevis-sensing lock 50 as suggested in FIG. 6. Key 80 is then rotated to rotate interference member 56 and align flats 142 with narrowed portion 146 such that protruding portions 150 are disengaged from flats 106 and interference member 56 is allowed to pass through opening 52 of clevis 34 as suggested in FIGS. 7-9.

Clevis-sensing lock 50, as assembled, is shown in FIGS. 10 and 11. Coupler shaft 68 and lock cylinder 102 are aligned with aperture 82 of handle 42 to allow insertion of key 80 as suggested in FIG. 10. Detent pins 130 are positioned to engage with lock cylinder 102 to block rotation of lock cylinder 102 until key 80 is inserted as suggested in FIG. 11. In the illustrative embodiment, clevis-sensing lock 50 was assembled and attached to handle 42 such that clevis-sensing lock 50 is initially in the locked orientation as suggested in FIGS. 10 and 11. After key 80 is inserted and turned for the first time, clevis-sensing lock 50 will need to be engaged with clevis 34 in order to turn and remove key 80 as further detailed below.

Figure 17:
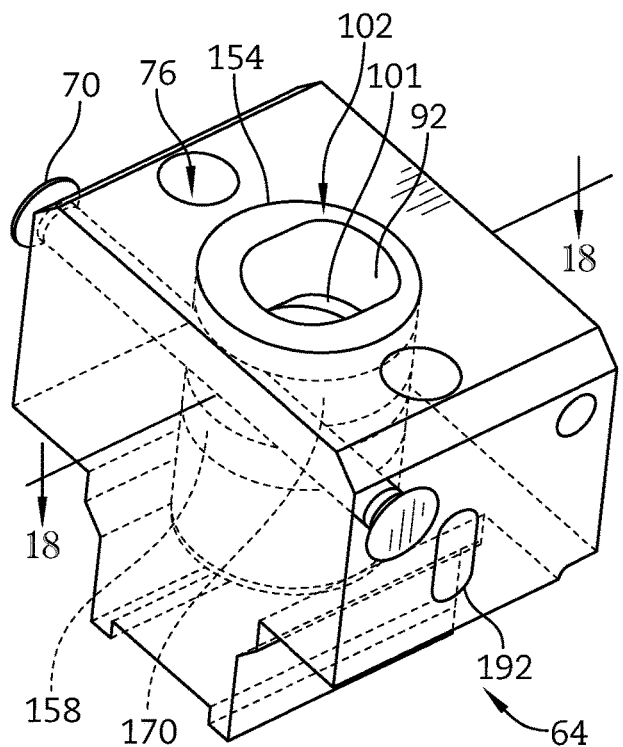
FIG. 17 is a perspective view of the block of FIG. 15 showing a fastener extending through the block for connecting the block to the handle and suggesting that the fastener rides in a groove of the lock cylinder.

Key 80 includes head 84 and shaft 98 coupled to head 84 as shown in FIG. 5. Shaft 98 is hollow to define a cavity 96 sized to receive coupler shaft 68. Lock cylinder 102 is formed to define a shoulder 101 as shown in FIG. 17. A protrusion 94 extends radially from shaft 98 and aperture 82 of handle 42 is shaped to allow shaft 98 and protrusion 94 to pass therethrough as suggested in FIG. 12.

Figures 13, 14:
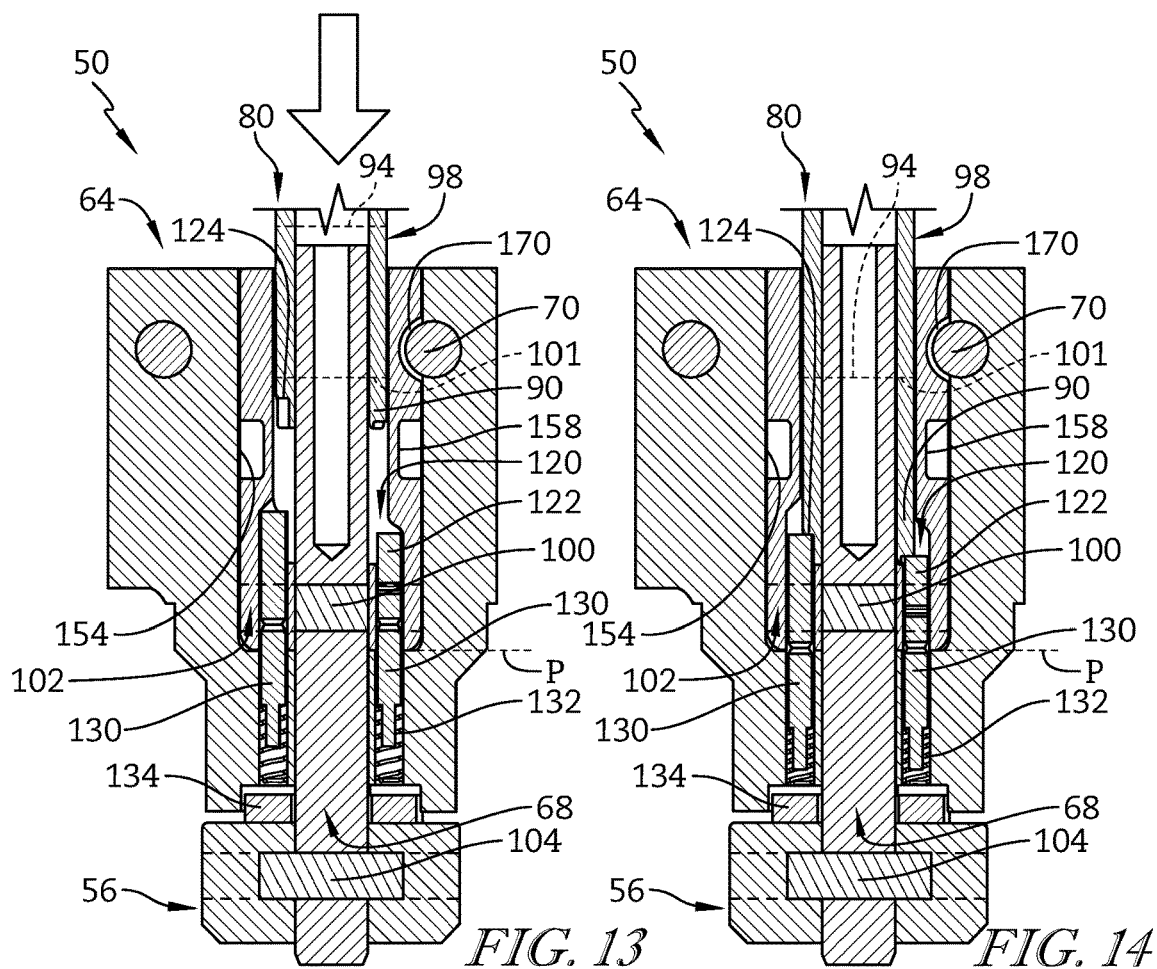
FIG. 13 is a partial sectional view taken along line 13-13 in FIG. 12 showing the key extending into the clevis-sensing lock toward the tumbler pin arrangement and suggesting that the tumbler pin arrangement blocks rotation of the lock cylinder when misaligned from a bottom plane of the lock cylinder.
FIG. 14 is a view similar to FIG. 13 showing the key fully inserted into the lock cylinder such that a protrusion of the key engages a shoulder of the lock cylinder such that the tumbler pin arrangement is aligned with the bottom plane of the lock cylinder.

In the locked orientation, an interface between tumbler pins 122 and detent pins 130 is misaligned from a bottom plane P of lock cylinder 102 such that detent pins 30 engage with lock cylinder 102 and block 64 to prevent rotation of lock cylinder 102 as suggested in FIG. 13. A leading end 90 of key 80, having mating portions 124 corresponding to tumbler pins 122, extends into lock cylinder 102 to engage with tumbler pins 122 and align detent pins 130 with bottom plane P to allow rotation of lock cylinder 102 as suggested in FIGS. 13 and 14. Protrusion 94 of key 80 engages with shoulder 101 of lock cylinder 102 to limit insertion of key 80 and ensure proper alignment of detent pins 130 with bottom plane P.

Figure 15:
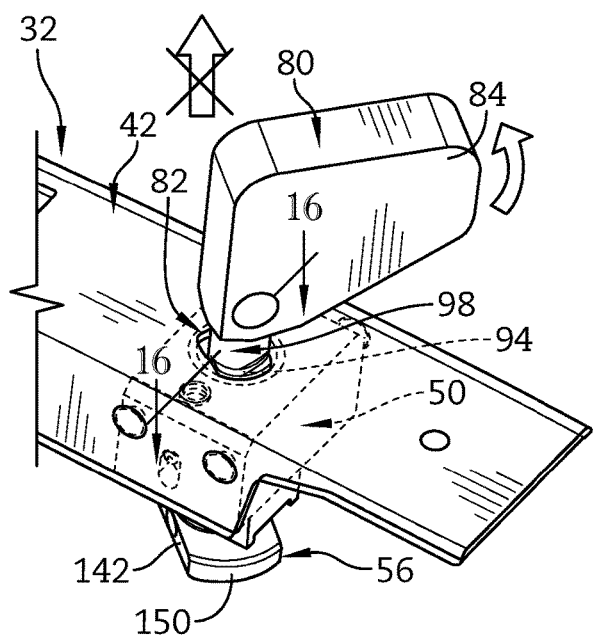
FIG. 15 is a perspective view of the hook latch assembly of FIG. 14 showing the key rotated relative to the handle.
Figure 16:
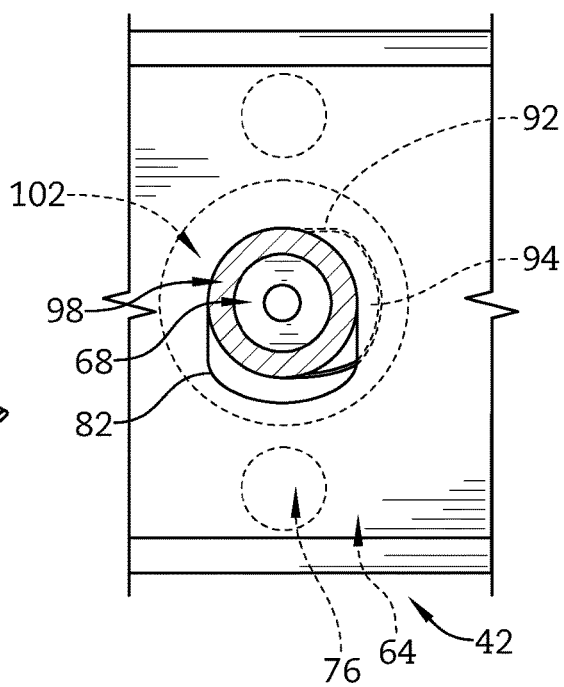
FIG. 16 is a top plan view of the handle of FIG. 15 showing that the protrusion of the key is positioned under the handle to trap the key in the locking mechanism, and suggesting that the key can only be removed when rotated to align with a key hole of the handle.

As key 80 is rotated to unlock clevis-sensing lock 50, protrusion 94 extends under handle 42 and becomes misaligned from aperture 82 as suggested in FIGS. 15 and 16. As such, key 80 is trapped inside clevis-sensing lock 50 until key 80 is turned to re-lock clevis-sensing lock 50. This prevents key 80 and signal flag 17 from being removed before latch mechanism 30 is in the locked and closed position to ensure that panels 13, 15 are properly secured in the closed position.

Figure 18:
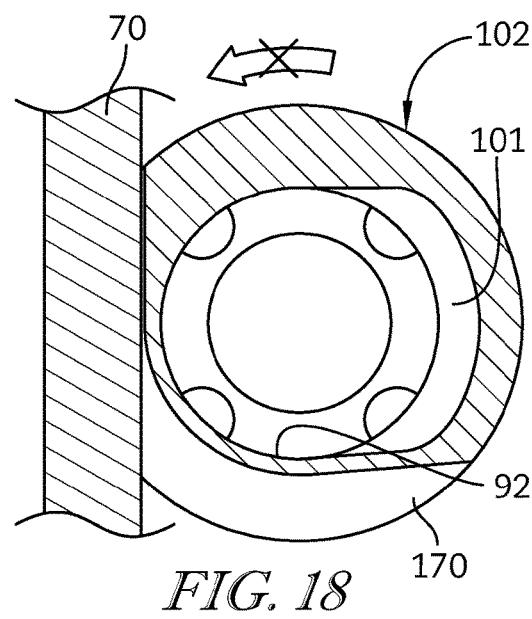
FIG. 18 is a partial sectional view taken along line 18-18 in FIG. 17 showing that the fastener engages with the lock cylinder to prevent over-rotation of the lock cylinder.
Figure 19:
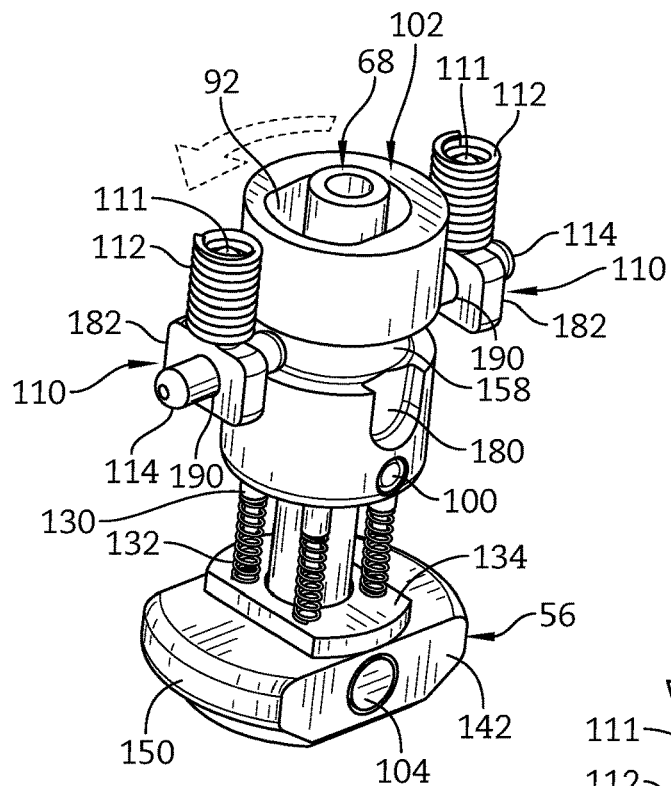
FIG. 19 is a perspective view of the lock cylinder of FIG. 15 showing that cross-pins slide in a groove of the lock cylinder and are retained by heads of guide pins and suggesting that the lock cylinder is about to rotate relative to the cross-pins.
Figure 20:
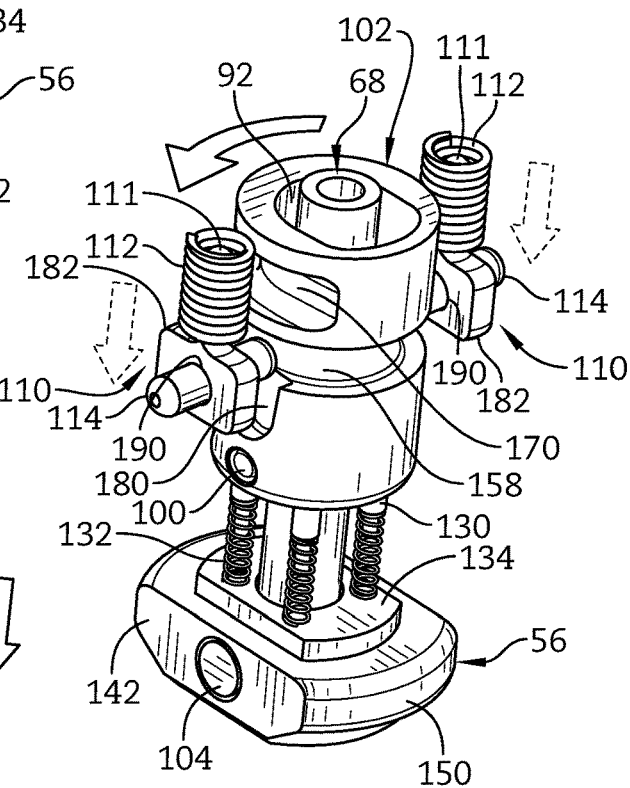
FIG. 20 is a view similar to FIG. 19 showing the cross-pins located above slots formed in the lock cylinder after rotation of the lock cylinder and suggesting that springs are positioned to force the cross-pins downward.
Figure 21:
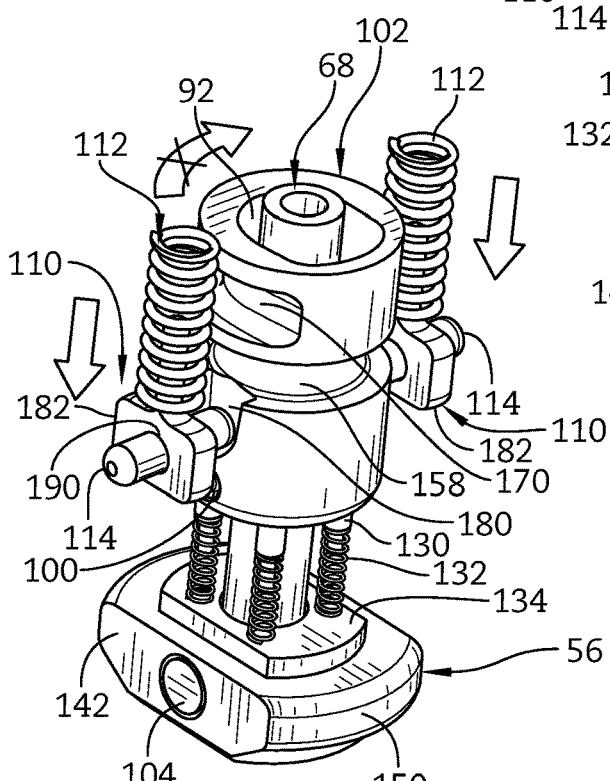
FIG. 21 is a view similar to FIG. 20 showing the cross-pins positioned in the slots of the lock cylinder and suggesting that the cross-pins prevent rotation of the cylinder while located in the slots.

Lock cylinder 102 is formed to include a groove 170 as shown in FIGS. 17 and 18. One of pins 70 extends through block 64 to engage with groove 170. Groove 170 only partially extends around lock cylinder 102 to control rotation of lock cylinder 102. In the illustrative embodiment, lock cylinder 102 is limited to about 90 degrees of rotation. In some embodiments, that lock cylinder 102 rotates further than 90 degrees. Lock cylinder 102 is also formed to include an annular groove 158 with axial slots 180 extending downward therefrom as shown in FIGS. 19-21. Cross-pins 114 slide in annular groove 158 as lock cylinder 102 is rotated as suggested in FIGS. 19-20. Lock cylinder 102 is rotated until cross-pins 114 are aligned with axial slots 180. Cross-pins 114 are forced into axial slots 180 by springs 112 to engage with lock cylinder 102 and block rotation of lock cylinder 102 as suggested in FIGS. 20-21.

Figure 22:
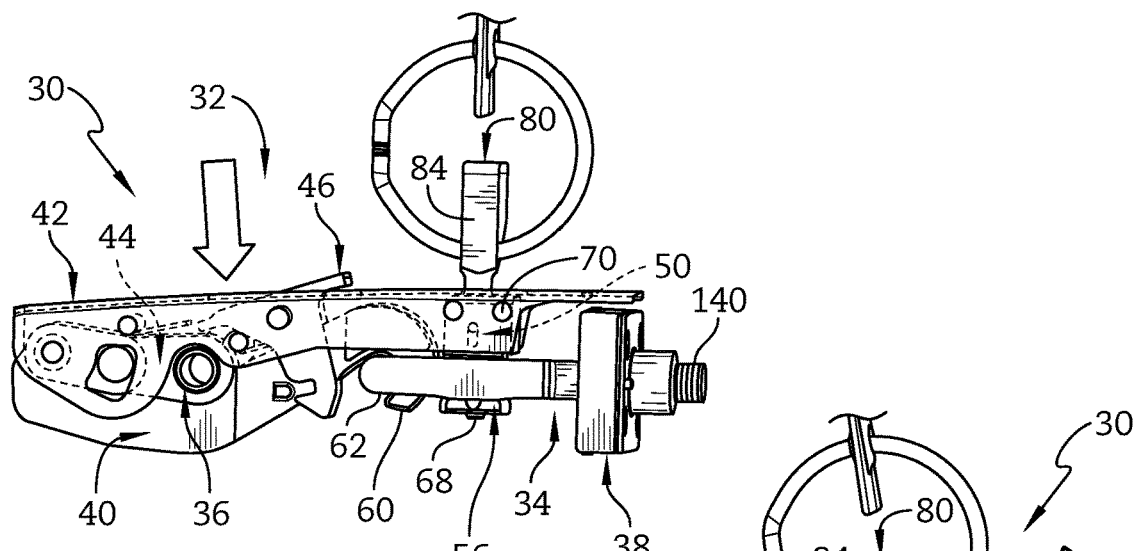
FIG. 22 is a side elevation view of the latch mechanism of FIG. 7 showing the key inserted into the clevis-sensing lock and suggesting that a handle release is rotated to allow the handle to be lifted relative to the clevis.
Figure 23:
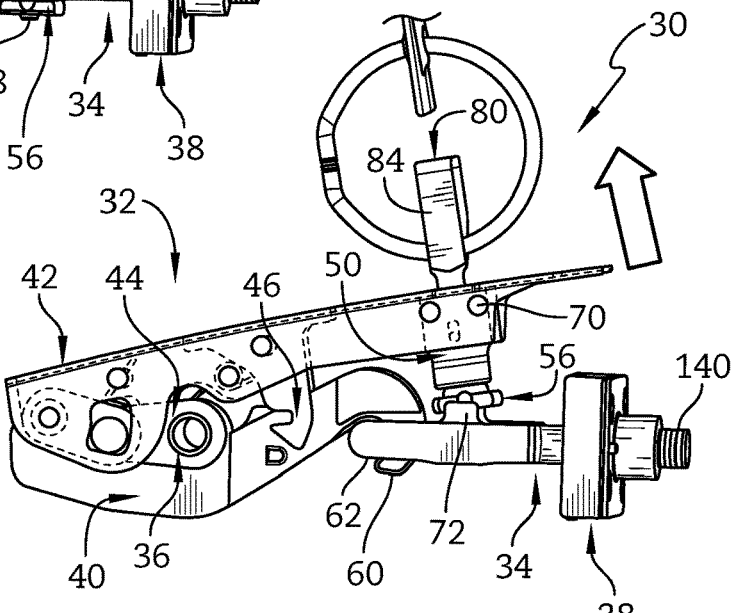
FIG. 23 is a view similar to FIG. 22 showing the handle partially lifted to pass the clevis-sensing lock out of the clevis.
Figure 24:
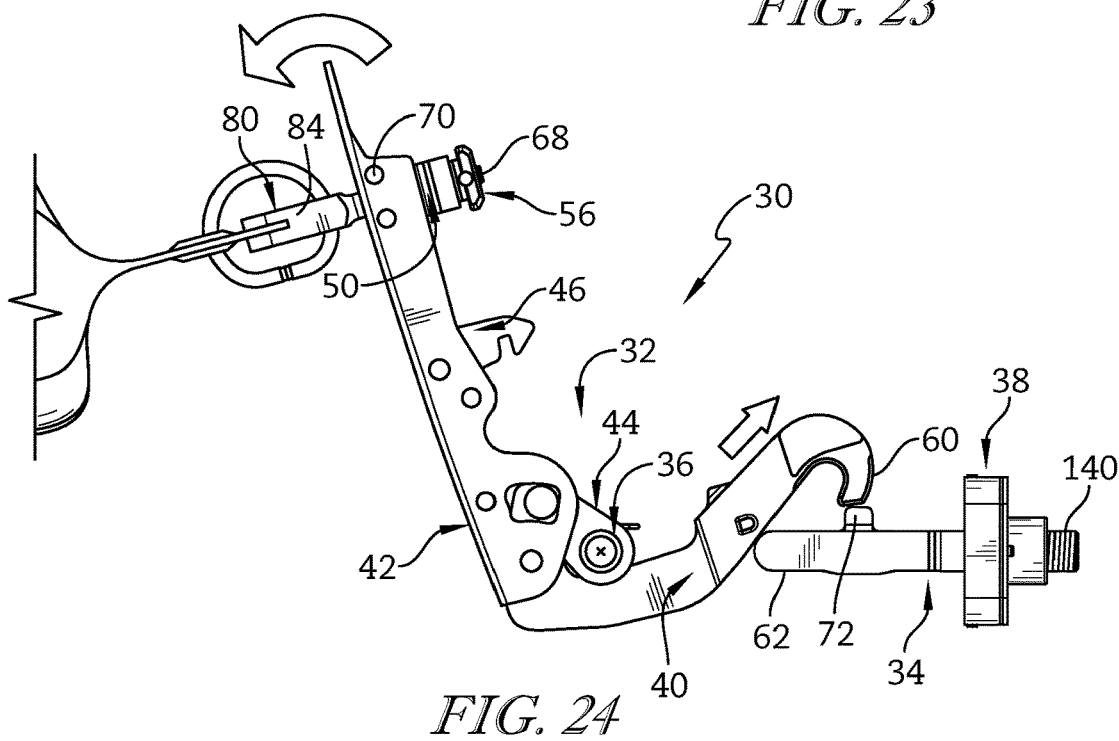
FIG. 24 is a view similar to FIG. 23 showing the handle rotated relative to the clevis it release the hook member from the clevis.

Once clevis-sensing lock 50 is unlocked by key 80, latch mechanism 30 can be opened as suggested in FIGS. 22-24. A handle release 46 is coupled to handle 42 and engages with hook member 40 when latch mechanism 30 is in a closed position as suggested in FIG. 22. Handle release 46 is rotated to disengage from hook member 40. Handle 42 is lifted to pass interference member 56 out of clevis 34 as suggested in FIG. 23. Further rotation of handle 42 disengages hook end 60 from hook-end receiver 62 to allow movement of hook-handle assembly 32 relative to clevis 34 as suggested in FIG. 24.

Figure 25:
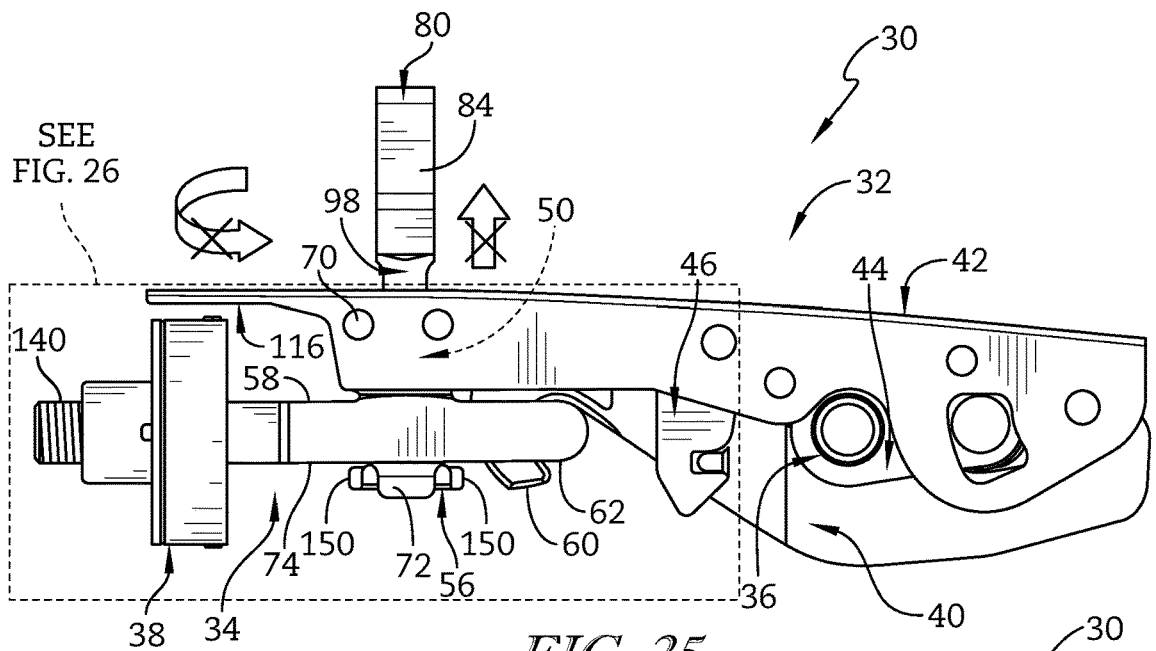
FIG. 25 is a side elevation view of the latch mechanism of FIG. 7 showing the clevis rotated such that fins coupled to an upper surface are pointing downward and suggesting that the key cannot be rotated or removed while the clevis is in this position.
Figure 26:
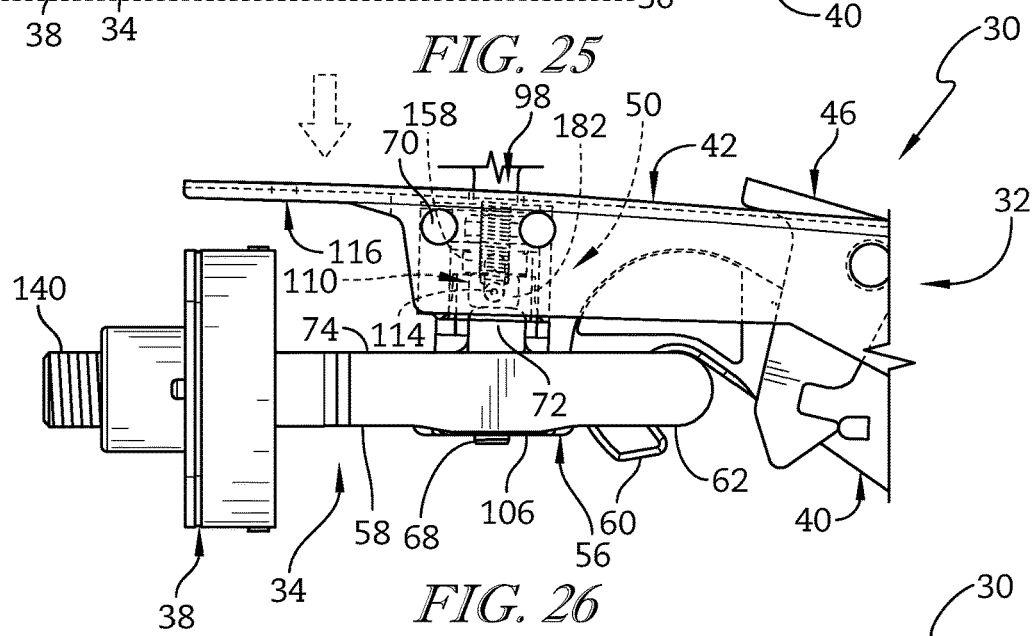
FIG. 26 is an enlarged view of the latch mechanism of FIG. 25 showing the clevis rotated such that the fins point upwards and suggesting that as the handle is lowered toward the clevis the fins engage with the heads of the guide pins.
Figure 27:
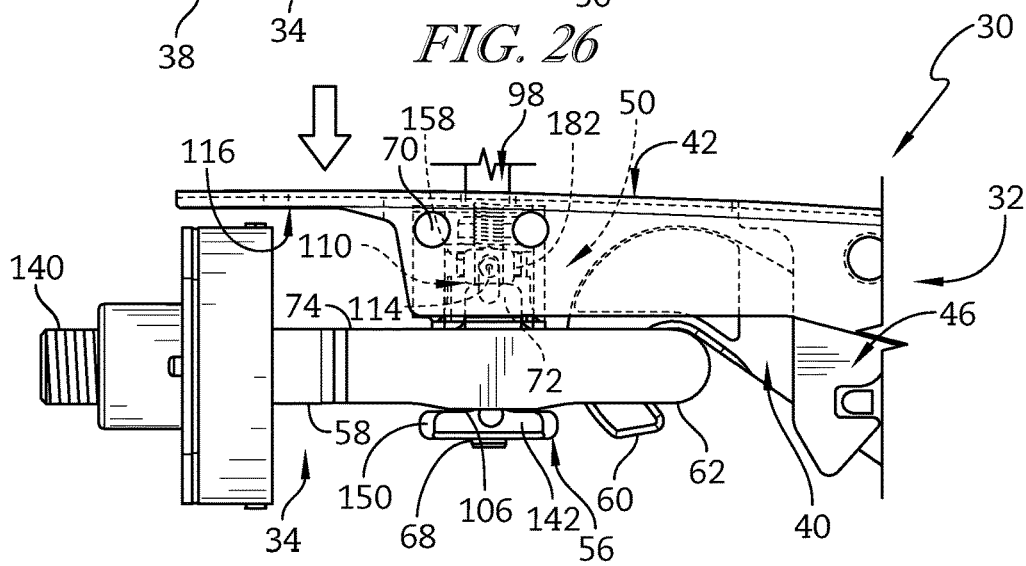
FIG. 27 is a view similar to FIG. 26 showing the handle fully lowered and suggesting that the fins of the clevis force the cross-pins upward out of the slot of the lock cylinder to allow rotation and removal of the key.

Fins 72 of clevis 34 are engage with guide pins 110 to allow rotation and removal of key 80 as suggested in FIGS. 25-27. Clevis 34 is shown with fins 72 facing downward in FIG. 25. As such, even though latch mechanism 30 is in a closed position, removal of key 80 is prevented by clevis-sensing lock 50. Thus, latch mechanism 30 is prevented from being in an improper unlocked and closed position where panels 13, 15 may inadvertently open during operation of the aircraft. With clevis 34 properly oriented, fins 72 engage with guide pins 110 during closure of latch mechanism 30 to move cross-pins 114 out of axial slots 180 and allow rotation of lock cylinder 102 as suggested in FIGS. 26-27.

Figure 28:
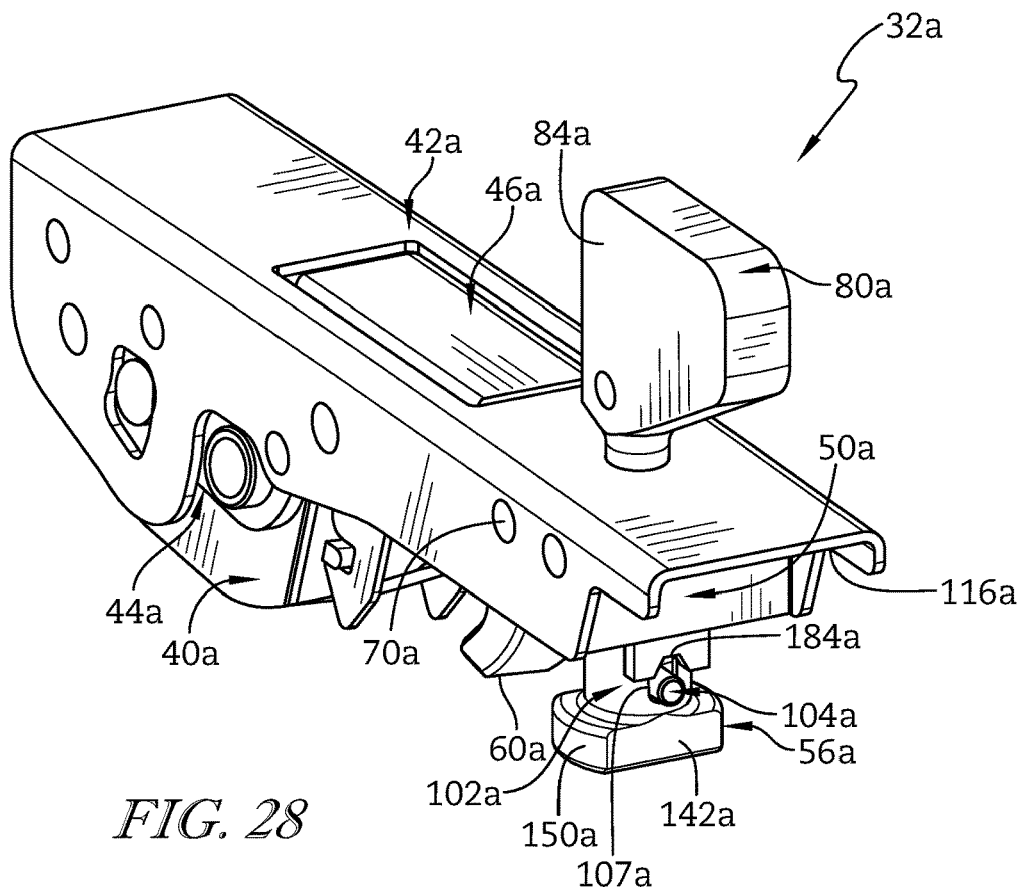
FIG. 28 is a perspective view of a hook latch assembly incorporating an alternate embodiment of a clevis-sensing lock in accordance with the present disclosure.

A hook-handle assembly 32a incorporating an alternative clevis-sensing lock 50a in accordance with the present disclosure is shown in FIG. 28. Similar to hook-handle assembly 32, hook-handle assembly 32a includes a handle 42a, a hook member 40a, and a linkage arrangement 44a coupled between handle 42a and hook member 40a. A handle release 46a is coupled to handle 42a to engage with hook member 40a. Clevis-sensing lock 50a is coupled to an underside surface 116a of handle 42a. In the illustrative embodiment, hook-handle assembly 32a and clevis-sensing lock 50a are configured to cooperate with the same clevis 34 as hook-handle assembly 32 of latch mechanism 30, described above. Hook-handle assembly 32a also operates in a similar fashion to hook-handle assembly 32. As such, discussion of hook-handle assembly 32a will be limited for sake of brevity. As discussed herein, features of hook-handle assembly 32 can be incorporated into hook-handle assembly 32a, and vice versa, without departing from the present disclosure.

Figure 30:
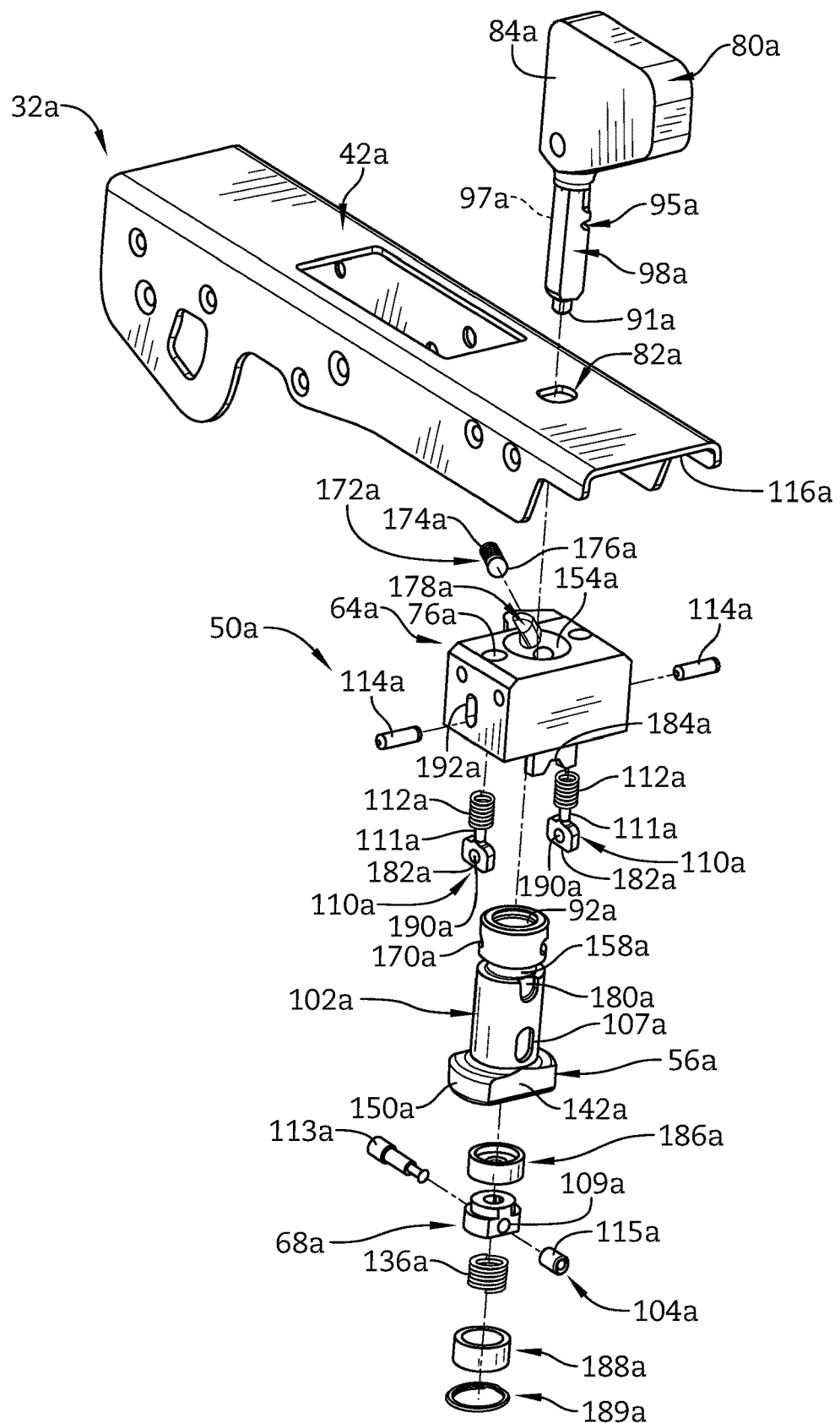
FIG. 30 is an exploded assembly view of the hook latch assembly of FIG. 28.

Clevis-sensing lock 50a includes a block 64a and a lock cylinder 102a configured to couple an interference member 56a with block 64a as suggested in FIGS. 28 and 30. Block 64a is coupled to handle 42a by pins 70a and is configured to receive a key interface 68a to control rotation of interference member 56a coupled to lock cylinder 102a as suggested in FIG. 30. Lock cylinder 102a is received in a bore 154a of block 64a and coupled to key interface 68a by a pin assembly 104a to rotate with interference member 56a. Pin assembly 104a moves relative to a notch 184a of block 64a to control movement of lock cylinder 102a as suggested in FIGS. 32-35.

Figure 29:
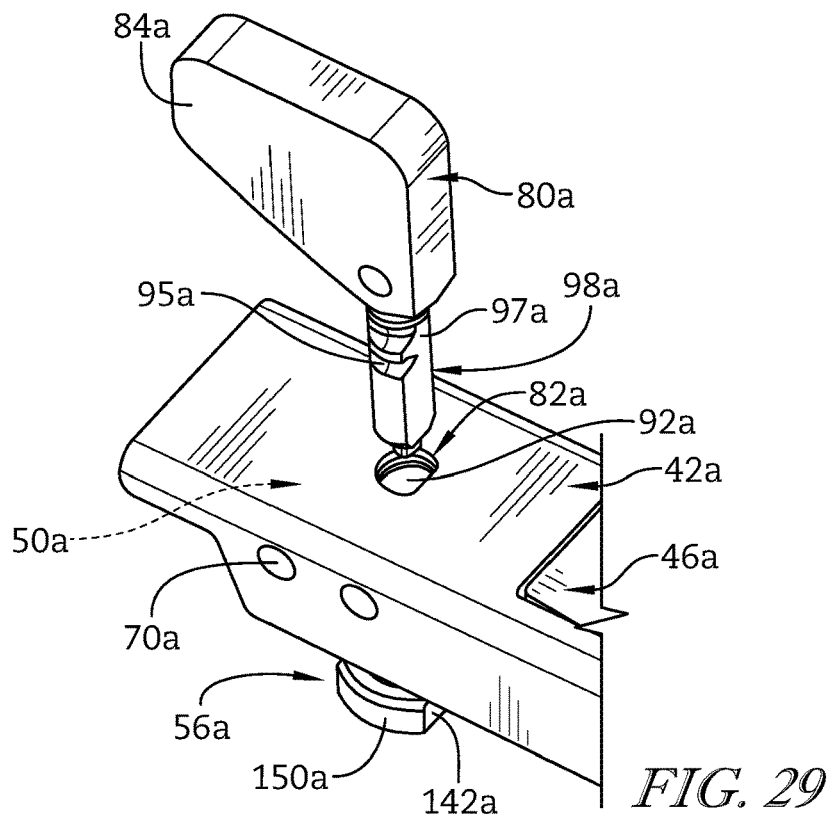
FIG. 29 is an upper perspective view of the hook latch assembly of FIG. 28.

Lock cylinder 102a is formed to include a bore 92a aligned with an aperture 82a of handle 42a and configured to receive a shaft 98a of a key 80a for rotation of lock cylinder 102a and interference member 56a as suggested in FIGS. 29 and 30. Key 80a includes a head 84a coupled to shaft 98a. Shaft 98a is formed to define a flat side 97a to orient key 80a during insertion. Key 80a also includes a grip tip 91a coupled to shaft 98a and configured to engage with key interface 68a as suggested in FIGS. 30 and 36-37.

To assemble clevis-sensing lock 50a, a tamper guard 186a, key interface 68a, a spring 136a, and a spacer 188a are inserted into lock cylinder 102a and retained therein by a retainer ring 189a as suggested in FIG. 30. A pin 113a is inserted through a slot 107a of lock cylinder 102a and a hole 109a of key interface 68a. Pin 113a is secured by a sleeve 115a coupled to pin 113a to form pin assembly 104a. Spring 136a engages with spacer 188a to bias key interface 68a and pin assembly 104a toward an upper end of slot 107a.

Guide pins 110a are received in cavities 76a of block 64a as suggested in FIG. 30. Guide pins 110a include a head 182a and shaft 111a coupled to head 182a. A spring 112a is positioned to surround shaft 111a. Head 182a is formed to include a hole 190a for receiving a cross-pin 114a. Guide pins 110a and springs 112a are inserted into cavities 76a and cross-pins 114a are inserted through slots 192a formed in block 64a and holes 190a of heads 182a to retain guide pins 110a within cavities 76a. Lock cylinder 102a is inserted into a bore 154a of block 64a and engaged by cross-pins 114a.

A ball detent assembly 172a is positioned within a ball detent receiver 178a as suggested in FIG. 30. Ball detent assembly 172a includes a spring 174a and a ball bearing 176a. Spring 174a is configured to bias ball bearing 176a toward a detent recess 179a of lock cylinder 102a as suggested in FIG. 40. Block 64a is coupled to handle 42a by pins 70a such that an upper portion of cavities 76a and ball detent receiver 178a, and side portions of slots 192a, are covered as suggested in FIG. 30. As such, handle 42a retains springs 112a within cavities 76a, ball detent assembly 172a within ball detent receiver 178a, and cross-pins 114a within slots 192a.

Similar to interference member 56, interference member 56a includes protruding portions 150a and flats 142a extending between protruding portions 150a as shown in FIG. 30. Protruding portions 150a are configured to engage with clevis 34. Flats 142a are configured to align with clevis 34 such that protruding portions 150a are disengaged from clevis 34 and interference member 56a is allowed to pass through opening 52 of clevis 34.

Figure 31:
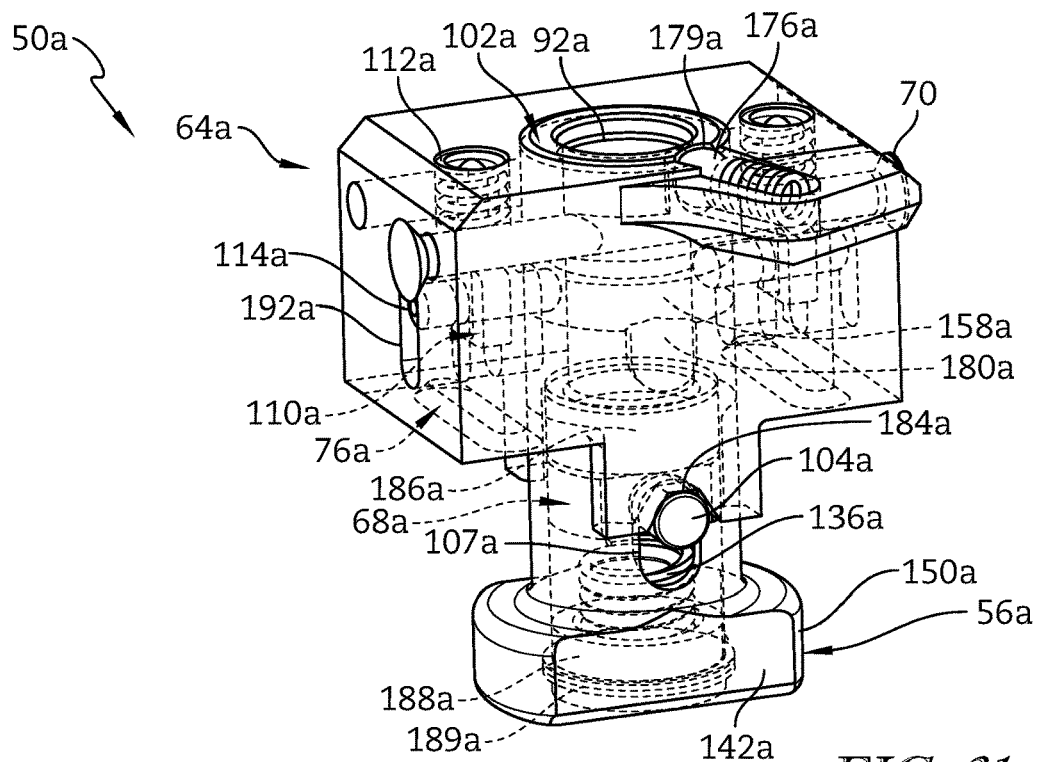
FIG. 31 is a perspective view of the alternative clevis-sensing lock of FIG. 28.

Clevis-sensing lock 50a, as assembled, is shown in FIG. 31. In the illustrative embodiment, clevis-sensing lock 50a was assembled and attached to handle 42a such that clevis-sensing lock 50a is initially in a locked orientation. After key 80 is inserted and turned for the first time, clevis-sensing lock 50 will need to be engaged with clevis 34 in order to turn and remove key 80a as further detailed below.

Figure 32:
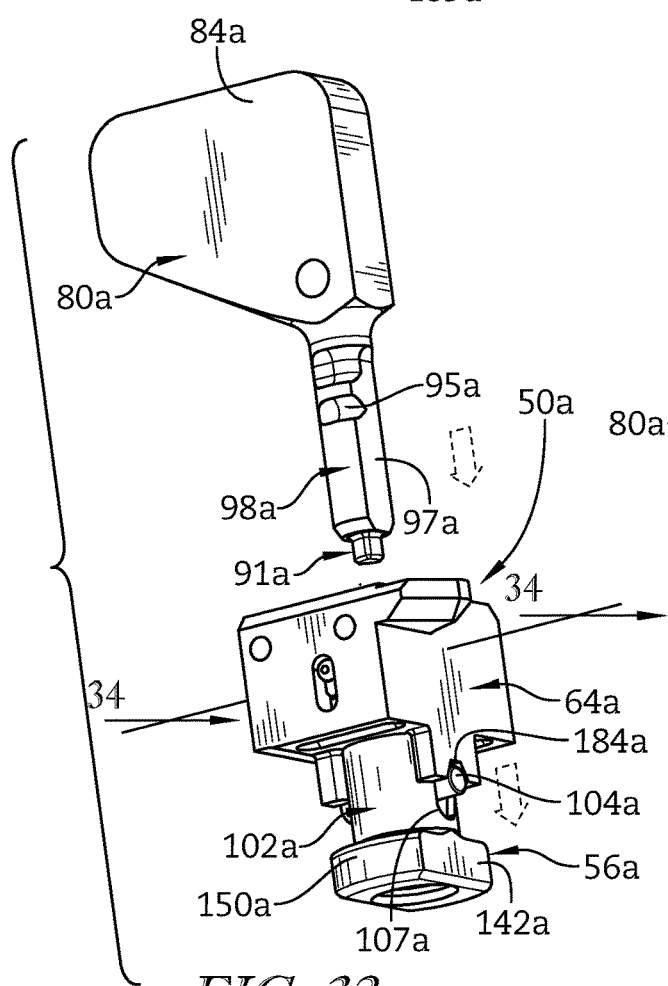
FIG. 32 is a perspective view of the alternative clevis-sensing lock of FIG. 31.
Figure 33:
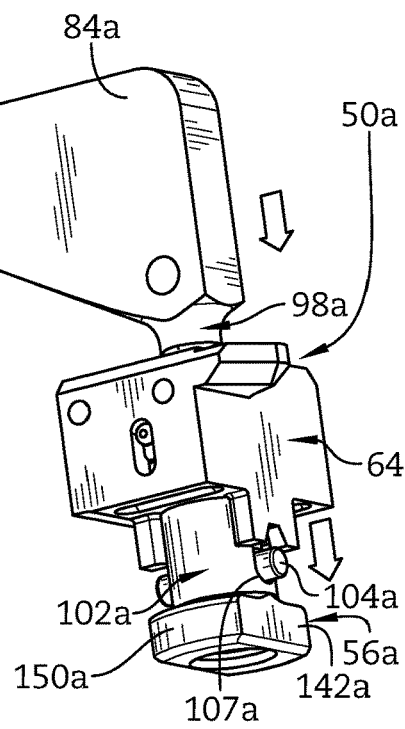
FIG. 33 is a view similar to FIG. 32.

Key 80a is inserted into clevis-sensing lock 50a to move pin assembly 104a out of notch 184a as suggested in FIGS. 32 and 33. Shaft 98a of key 80a extends into lock cylinder 102a and grip tip 91a passes through tamper guard 186a to engage with key interface 68a as suggested in FIG. 34. Key 80a is forced downward against the force of spring 136a to move pin assembly 104a as suggested in FIG. 35. In the illustrative embodiment, grip tip 91a has a geometric shape, such as a triangle, which corresponds with a geometric shape of a tip receiver 69a of key interface 68a as suggested in FIGS. 36 and 37. Key interface 68a also includes a projecting portion 67a to engage with lock cylinder 102a. As such, grip tip 91a engages with tip receiver 69a to rotate key interface 68a, which in turn engages with lock cylinder 102a to rotate lock cylinder 102a with key 80a.

Figure 38:
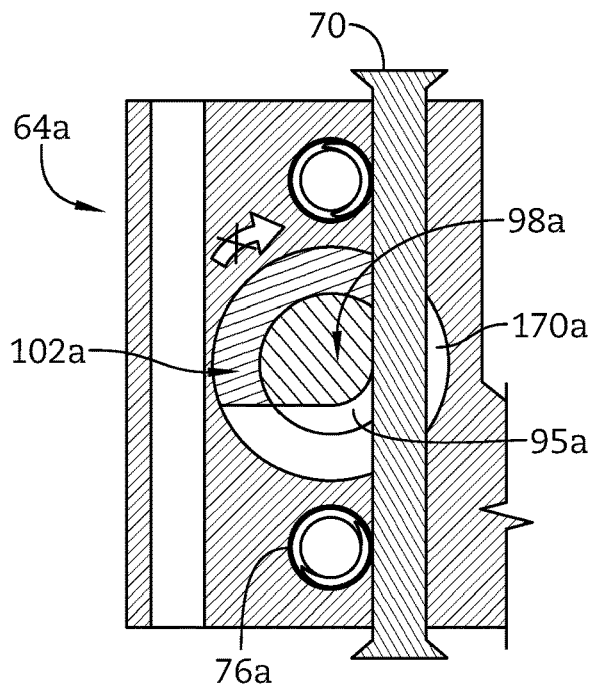
FIG. 38 is a sectional view taken along line 38-38 in FIG. 35.

Shaft 98a of key 80a is formed to include a groove 95a as suggested in FIGS. 35-36 and 38. Side 97a of shaft 98a allows key 80a to pass by pin 70 and into lock cylinder 102a as suggested in FIG. 35. Key 80a is allowed to turn to unlock clevis-sensing lock 50a when groove 95a aligns with pin 70a as suggested in FIGS. 35 and 38. Lock cylinder 102a also includes a groove 170a which cooperates with pin 70a to restrict rotation of lock cylinder 102a. Cross-pins 114a cooperate with a groove 158a and slot 180a of lock cylinder 102a to further control rotation of lock cylinder 102a, as suggested in FIGS. 30 and 31, similar to clevis-sensing lock 50, described above.

Figure 39:
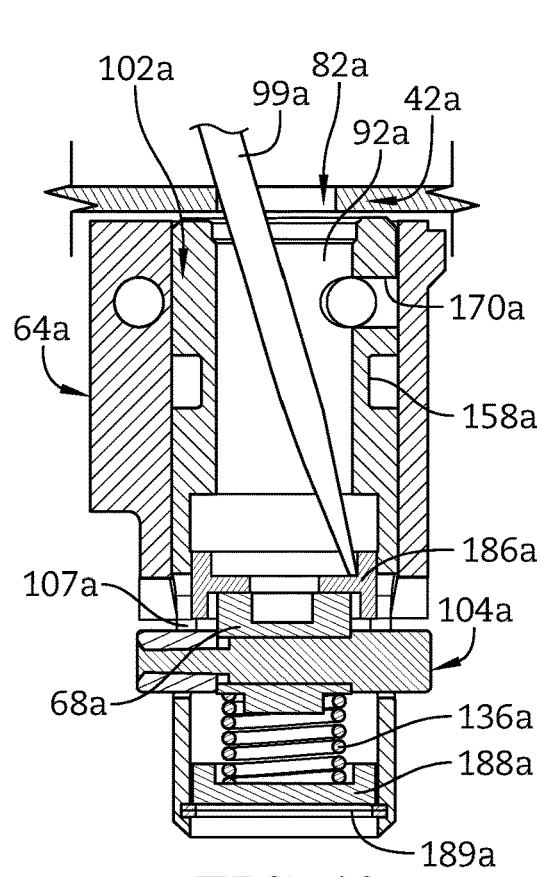
FIG. 39 is a view similar to FIG. 34.
Figure 40:
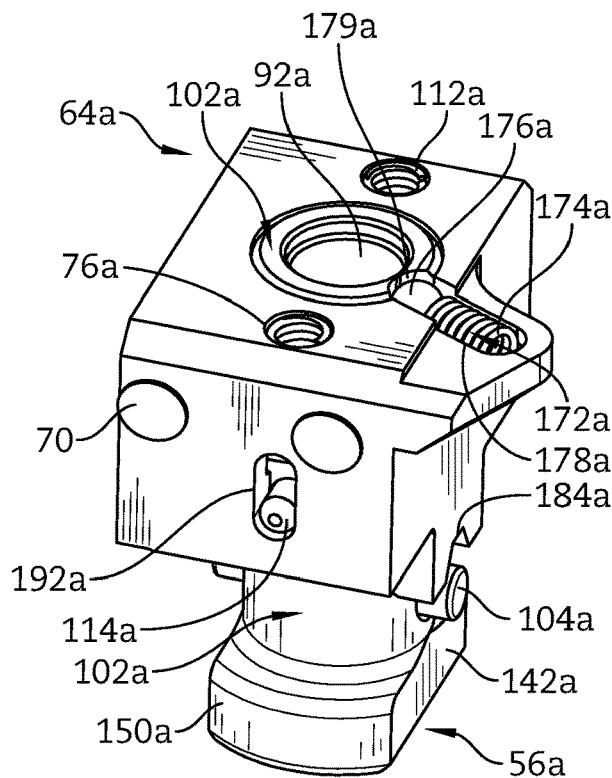
FIG. 40 is an upper perspective view of the alternative clevis-sensing lock of FIG. 31.

Clevis-sensing lock 50a includes anti-tamper features as suggested in FIGS. 39 and 40. Tamper guard 186a minimizes the ability of a lock pick 99a, such as a screw driver or other tool, to enter clevis-sensing lock 50a and rotate lock cylinder 102a as suggested in FIG. 39. Tamper guard 186a is configured to slide and rotate on key interface 68a without providing sufficient friction to turn lock cylinder 102a to disengage interference member 56a from clevis 34. Ball detent assembly 172a engages with lock cylinder 102a to increase the force required to turn lock cylinder 102a as suggested in FIG. 40. These features cooperate to prevent unlocking of clevis-sensing lock 50a without the use of key 80a.

In illustrative embodiments, the clevis-sensing locks described herein can be configured for use with a specific latch design or configured to be used as a retrofit on a remanufactured latch. An existing latch assembly can reuse most of the parts with perhaps a modification to the handle to remove a pre-existing handle release and to accommodate a clevis-sensing lock. Additionally, the clevis can be replaced merely by disengaging the threaded portion of the old clevis and attaching a new clevis which will include the fins and other corresponding structures detailed above. This design is easy to operate, difficult to defeat, and provides a nearly fail-proof method of ensuring the latch has properly secured the latch cowl.

In illustrative embodiments, a clevis-sensing lock can be retained on a latch mechanism for preventing the latch mechanism from opening inadvertently. The clevis-sensing lock includes a tool, key, or other device which must be used to unlock the clevis-sensing lock to permit movement of the handle to disengage the latch mechanism. The key cannot be removed from the lock when the latch is open. Furthermore, the key includes a visual indicator such as a flag, streamer, or other device which provides a clear visual indicator that the key is retained in the lock. This visual indicator extends away from the aircraft to provide a clear visual indication of the unlatched condition. Since the key can only be removed from the lock when the latch is, in fact, in a proper closed position, the presence of such a visual indicator indicates that the latches are not secure for flight operations.

Engine cowls may sometimes appear to be in a latched closed position when they are not due to the low profile of the latches and low height from the ground of the engines of the aircraft. It is often times that technicians will clip the latches up tight against the cowling without latching them to prevent snags with clothing during operations on the engine. These situations can be problematic if an aircraft takes off while the latches are open, and may cause damage to the cowlings or engines while in flight.

In illustrative embodiments, a clevis sensing lock can be attached to any hook latch that engages with a clevis. The clevis sensing lock attaches to the handle of the hook latch, and passes through the clevis when the latch is closed. It requires a key or tool to unlock the latch and allow the latch to open. When the latch is open, the key cannot be removed from the handle. They key has a long flag or streamer attached to it so that anybody standing around the aircraft, not necessarily near the engine, can see that the cowls are not closed and latched. To unlatch the cowls, the operator inserts the key, with the long flag or streamer attached, into the latch, turns the key, then opens the latch.

In illustrative embodiments, the lock includes a block which holds all of the lock's internal parts to the handle of the hook latch. The block has a large hole for a lock cylinder, and some slots and holes for some pins, guides, and springs. Another pair of slots on the block allows fins that are attached to the clevis to fit into the block. The T-shaped lock cylinder, which fits into the block, has two large flats on one end, which allows it to fit through the clevis during handle opening and closing.

In illustrative embodiments, at the other end of the lock, there is a hole for a key to fit into. Near the open end of the hole, the lock cylinder has a retaining groove that protrudes into the hole, but only part way around the lock cylinder. This groove on the lock cylinder engages with a rivet that passes through the handle and through the block in such a way that the lock cylinder cannot come out of the lock, and in such a way that the lock cylinder can only turn a predetermined amount. The rivet protrudes into the hole of the lock such that the key has a corresponding flat on it that allows the key to pass by the rivet when the latch is closed. When the key is inserted into the lock, a groove on the key matches the groove on the lock cylinder that engages with the rivet that holds the lock cylinder in place. When the key is turned, the groove on the key engages with the rivet, which prevents the key from being removed.

In illustrative embodiments, the end of the key has a feature which grabs onto a mating component, sometimes called a plug, down in the bottom of the hole of the lock cylinder. The shape at the end of the key can be any shape that allows the key to grab the plug and turn it. The plug has a spring behind it, and a hole for a cross pin, which fits into a through slot on the lock cylinder. The cross pin limits the amount of axial movement in the lock cylinder and also ensures that the key, plug, and lock cylinder turn together. When the key is not inserted into the lock, the cross pin is pushed by the spring, via the plug, into a V-groove on the block, thereby preventing accidental rotation of the lock cylinder when the latch is closed. When the key is inserted into the lock, the cross pin is pushed out of the V-groove on the block, and the cylinder is allowed to turn. With this arrangement of the key, lock cylinder, and plug, they cannot be turned unless the key is fully inserted into the lock cylinder and engaged with the plug.

In illustrative embodiments, the lock cylinder also has a circular groove and two intersecting straight slots, which are parallel to the axis of the lock cylinder, that allow the ends of two locking pins to travel in them. The locking pins ride in a guide, inside the block. Each guide is pushed by a spring toward the clevis. The clevis has two fins which, in the latch closed position, engage with the guides, and push the guides and locking pins into the circular groove. When the locking pins are in the circular groove, the lock may be turned toward the unlock position. Once the lock cylinder is turned completely to the unlock position, the handle may be moved in the direction that opens the latch, and the engaging portion of the lock may pass through the clevis. The clevis has two fins which fit into some blind slots on the block, and push the guides and locking pins when the latch is closed. As the latch opens, and the handle moves away from the clevis, the fins on the clevis disengage from the guides and locking pins. The locking pins are then pushed down into the straight slots on the lock cylinder, which prevents the lock cylinder from turning toward the lock position and prevents the key from being removed.

In illustrative embodiments, there could be one or two flats on opposing sides of the lock cylinder. The locking pins would be longer and offset from the axis of the cylinder, such that they would fit tangentially into the circular groove on lock cylinder when the latch is in the closed position. When the latch is open, the locking pins would slide down onto the flats of the lock cylinder and prevent the lock cylinder from turning.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation so as to encompass all such modifications and equivalent structures and functions.

The invention claimed is:

1. A lock apparatus comprising:
    a block formed to include a first bore extending into the block and a pin-receiving slot extending into the block to intersect with the first bore;
    a lock member configured to be received in the first bore of the block and move relative to the block, the lock member including a first end and a second end spaced apart from the first end, the lock member formed to include an annular groove, an axial slot extending toward the first end of the lock member from the annular groove, and a second bore extending from the second end toward the first end;
    a cross-pin positioned within the pin-receiving slot of the block and configured to slide in the annular groove and axial slot of the lock member to control movement of the lock member;
    a tumbler arrangement coupled between the lock member and the block and configured to control movement of the lock member;
    a coupler shaft positioned within the second bore and coupled with the lock member to move therewith; and
    an interference member coupled to the coupler shaft at the first end of the lock member to move with the lock member.

2. The lock apparatus of claim 1, further comprising a guide pin having a head and a hole extending through the head, wherein the block is formed to include a cavity configured to receive the guide pin, and wherein the cross-pin extends through the hole of the guide pin.

3. The lock apparatus of claim 2, wherein the tumbler arrangement includes a detent spring, a detent pin positioned between the lock member and the detent spring, and a tumbler pin positioned between the detent pin and the lock member, wherein the detent spring is configured to bias the detent pin toward the tumbler pin, and wherein the detent pin is configured to engage with the block and the lock member to restrict movement of the lock member when an interface between the detent pin and the tumbler pin is misaligned from a lower surface of the lock member.

4. The lock apparatus of claim 3, further comprising a fastener extending through the block, wherein the lock member is formed to include a groove extending at least partially around a circumference of the lock member, wherein the fastener is received in the groove of the lock member, and wherein the groove of the lock member is configured to limit movement of the lock member relative to the block.

5. The lock apparatus of claim 3, further comprising a device having a head, a shaft coupled to the head, and a protrusion extending outward from the shaft, the shaft configured to be received in the lock member to engage with the tumbler arrangement to allow movement of the lock member, the protrusion configured to trap the shaft within the lock member when the lock member is in the unlocked position, and the head configured to extend away from the lock member to provide an indication of an unlocked state of the lock apparatus.

6. The lock apparatus of claim 5, wherein the device is further configured to engage with the tumbler pin and to align the interface between the detent pin and the tumbler pin with the lower surface of the lock member when the device is received in the lock member.

7. The lock apparatus of claim 6, wherein the device further includes an indicator coupled to the device and configured to enhance the visibility of the device and provide a signal to a user that the lock apparatus is in the unlocked position.

8. A lock apparatus for holding a first component relative to a second component, the lock apparatus comprising:
    a block coupled to the first component for movement with the first component relative to the second component between an opened position and a closed position, the block formed to include a first bore extending into the block and a pin-receiving slot extending into the block to intersect with the first bore;
    a lock member configured to be received in the first bore of the block and move relative to the block, the lock member including a first end and a second end spaced apart from the first end, the lock member formed to include an annular groove, an axial slot extending toward the first end of the lock member from the annular groove, and a second bore extending from the second end toward the first end;
    a cross-pin positioned within the pin-receiving slot of the block and configured to slide in the annular groove and axial slot of the lock member to control movement of the lock member;
    a tumbler arrangement coupled between the lock member and the block and configured to control movement of the lock member;
    a coupler shaft positioned within the second bore and coupled with the lock member to move therewith; and
    an interference member coupled to the coupler shaft at the first end of the lock member to move with the lock member between an unlocked position and a locked position,
    wherein the block and interference member are spaced apart from an opening of the second component when the first component is in the opened position, the interference member, in the unlocked position, is configured to pass through the opening of the second component as the first component moves toward the closed position, and the interference member, in the locked position, engages with the second component to block movement of the first component from the closed position toward the opened position relative to the second component.

9. The lock apparatus of claim 8, further comprising a guide pin having a head and a hole extending through the head, wherein the block is formed to include a cavity configured to receive the guide pin for sliding movement therein, and wherein the cross-pin extends through the hole of the guide pin for movement with the guide pin.

10. The lock apparatus of claim 9, wherein the tumbler arrangement includes a detent spring, a detent pin positioned between the lock member and the detent spring, and a tumbler pin positioned between the detent pin and the lock member, wherein the detent spring is configured to bias the detent pin toward the tumbler pin, and wherein the detent pin is configured to engage with the block and the lock member to restrict movement of the lock member when an interface between the detent pin and the tumbler pin is misaligned from a lower surface of the lock member.

11. The lock apparatus of claim 10, further comprising a fastener extending through the block, wherein the lock member is formed to include a groove extending at least partially around a circumference of the lock member, wherein the fastener is received in the groove of the lock member, and wherein the groove of the lock member is configured to limit movement of the lock member relative to the block.

12. The lock apparatus of claim 10, further comprising a device having a head, a shaft coupled to the head, and a protrusion extending outward from the shaft, the shaft configured to be received in the lock member to engage with the tumbler arrangement to allow movement of the lock member, the protrusion configured to engage with the first component to trap the shaft within the lock member when the lock member is in the unlocked position, and the head configured to extend away from the first component to provide an indication of an unlocked state of the lock apparatus.

13. The lock apparatus of claim 12, wherein the device is further configured to engage with the tumbler pin and to align the interface between the detent pin and the tumbler pin with the lower surface of the lock member when the device is received in the lock member.

14. The lock apparatus of claim 13, wherein the device further includes an indicator coupled to the device and configured to enhance the visibility of the device and provide a signal to a user that the lock apparatus is in the unlocked position.

15. The lock apparatus of claim 13, further comprising a fin extending from the second component adjacent to the opening, and wherein the fin is configured to engage with the guide pin to move the cross-pin out of the axial slot and into the annular groove to allow movement of the lock member with rotation of the device as the block moves toward the opening.

16. A lock apparatus for holding a first component relative to a second component, the lock apparatus comprising:
a block coupled to the first component for movement with the first component relative to the second component between an opened position and a closed position, the block formed to include a first bore extending into the block, a cavity adjacent to the first bore, and a pin-receiving slot extending into the block to intersect with the first bore and the cavity;
a lock member configured to be received in the first bore of the block and move relative to the block, the lock member including a first end and a second end spaced apart from the first end, the lock member formed to include an annular groove, an axial slot extending toward the first end of the lock member from the annular groove, and a second bore extending from the second end toward the first end;
a guide pin having a head and a hole extending through the head, the guide pin received in the cavity of the block for sliding movement therein;
a cross-pin positioned within the pin-receiving slot of the block and configured to slide in the annular groove and axial slot of the lock member to control movement of the lock member, the cross-pin extending through the hole of the guide pin for movement with the guide pin;
a tumbler arrangement coupled between the lock member and the block and configured to control movement of the lock member;
a coupler shaft positioned within the second bore and coupled with the lock member to move therewith;
an interference member coupled to the coupler shaft at the first end of the lock member to move with the lock member between an unlocked position and a locked position; and
a fin extending from the second component adjacent to an opening of the second component,
wherein the block and interference member are spaced apart from the opening of the second component when the first component is in the opened position, the interference member, in the unlocked position, is configured to pass through the opening of the second component as the first component moves toward the closed position, the interference member, in the locked position, engages with the second component to block movement of the first component from the closed position toward the opened position relative to the second component, and the fin is configured to engage with the guide pin to move the cross-pin out of the axial slot and into the annular groove to allow movement of the lock member.

17. The lock apparatus of claim 16, wherein the tumbler arrangement includes a detent spring, a detent pin positioned between the lock member and the detent spring, and a tumbler pin positioned between the detent pin and the lock member, wherein the detent spring is configured to bias the detent pin toward the tumbler pin, and wherein the detent pin is configured to engage with the block and the lock member to restrict movement of the lock member when an interface between the detent pin and the tumbler pin is misaligned from a lower surface of the lock member.

18. The lock apparatus of claim 17, further comprising a fastener extending through the block, wherein the lock member is formed to include a groove extending at least partially around a circumference of the lock member, wherein the fastener is received in the groove of the lock member, and wherein the groove of the lock member is configured to limit movement of the lock member relative to the block.

19. The lock apparatus of claim 18, further comprising a device having a head, a shaft coupled to the head, and a protrusion extending outward from the shaft, the shaft configured to be received in the lock member to engage with the tumbler arrangement to allow movement of the lock member, the protrusion configured to engage with the first component to trap the shaft within the lock member when the lock member is in the unlocked position, and the head configured to extend away from the first component to provide an indication of an unlocked state of the lock apparatus.

20. The lock apparatus of claim 19, wherein the device is further configured to engage with the tumbler pin and to align the interface between the detent pin and the tumbler pin with the lower surface of the lock member when the device is received in the lock member.

* * * * *